(12) United States Patent
Saori

(10) Patent No.: US 8,305,694 B2
(45) Date of Patent: Nov. 6, 2012

(54) ZOOM LENS SYSTEM

(75) Inventor: Masakazu Saori, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 200 days.

(21) Appl. No.: 12/783,612

(22) Filed: May 20, 2010

(65) Prior Publication Data

US 2010/0296174 A1 Nov. 25, 2010

(30) Foreign Application Priority Data

May 22, 2009 (JP) ................................. 2009-124477
May 14, 2010 (JP) ................................. 2010-111656

(51) Int. Cl.
*G02B 15/14* (2006.01)

(52) U.S. Cl. ......................................... 359/687; 359/676

(58) Field of Classification Search .................. 359/687, 359/676, 683
See application file for complete search history.

(56) References Cited

U.S. PATENT DOCUMENTS

| | | | |
|---|---|---|---|
| 5,528,423 A * | 6/1996 | Arimoto et al. | 359/687 |
| 7,609,446 B2 * | 10/2009 | Nanba | 359/557 |
| 7,672,063 B2 * | 3/2010 | Take | 359/687 |
| 2004/0051959 A1 | 3/2004 | Eguchi | |
| 2006/0072213 A1 | 4/2006 | Shibayama et al. | |
| 2007/0297067 A1 | 12/2007 | Muramatsu | |
| 2010/0033838 A1 | 2/2010 | Saori | |

FOREIGN PATENT DOCUMENTS

| | | | |
|---|---|---|---|
| JP | 2006-106191 | | 4/2006 |
| JP | 2006-284763 | | 10/2006 |
| JP | 2008-003195 | | 1/2008 |
| JP | 2008-304952 | | 12/2008 |
| WO | WO 2010/013435 | * | 2/2010 |

* cited by examiner

*Primary Examiner* — Jordan Schwartz
(74) *Attorney, Agent, or Firm* — Greenblum & Bernstein, P.L.C.

(57) ABSTRACT

A zoom lens system includes a positive first lens group, a negative second lens group, a positive third lens group, and a positive fourth lens group, in this order from an object. Upon zooming from the short focal length extremity to the long focal length extremity, the distance between the first and the second lens groups increases, and the distance between the second and the third lens groups decreases. The third lens group includes a positive first sub-lens group and a negative second sub-lens group, in this order from the object. The first sub-lens group comprises a positive lens element provided at the most object-side thereof and a cemented lens provided at the most image-side thereof. The cemented lens includes a positive lens element and a negative lens element, in this order from the object.

18 Claims, 28 Drawing Sheets

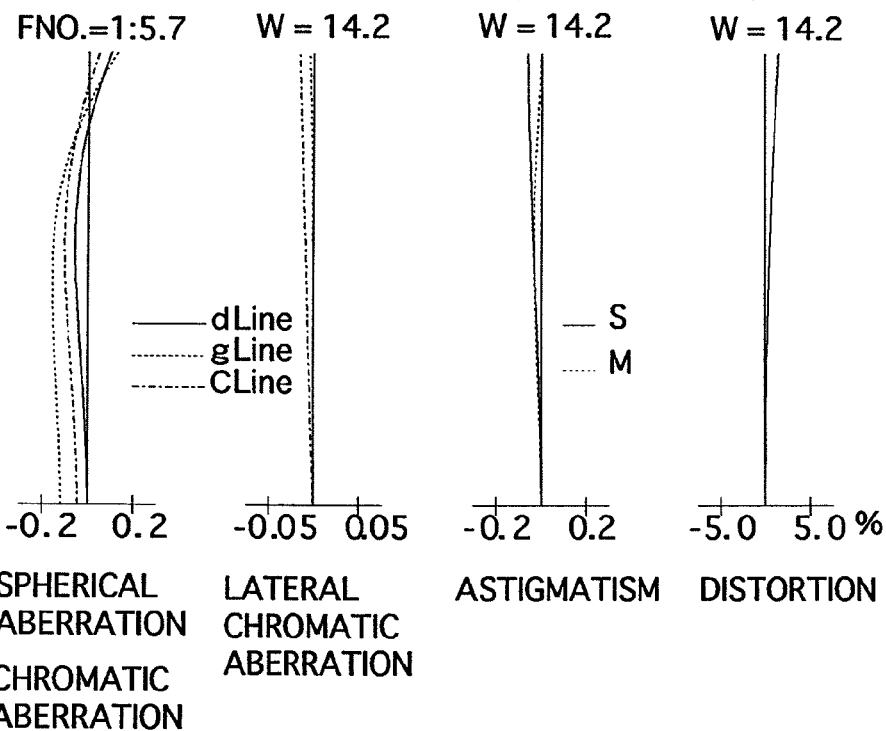
Fig. 2A  FNO.=1:5.7
Fig. 2B  W = 14.2
Fig. 2C  W = 14.2
Fig. 2D  W = 14.2
SPHERICAL ABERRATION
CHROMATIC ABERRATION
LATERAL CHROMATIC ABERRATION
ASTIGMATISM
DISTORTION
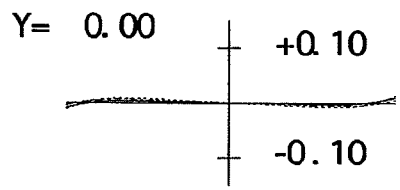
Fig. 3A  Y= 0.00
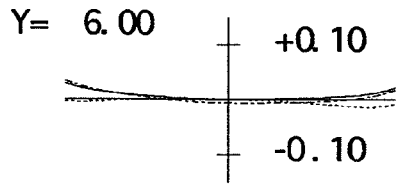
Fig. 3B  Y= 6.00
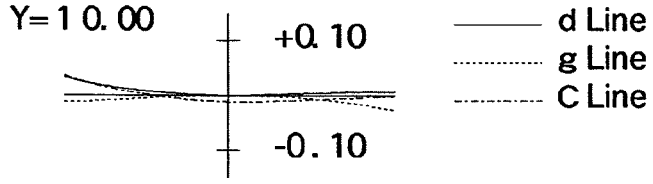
Fig. 3C  Y=10.00

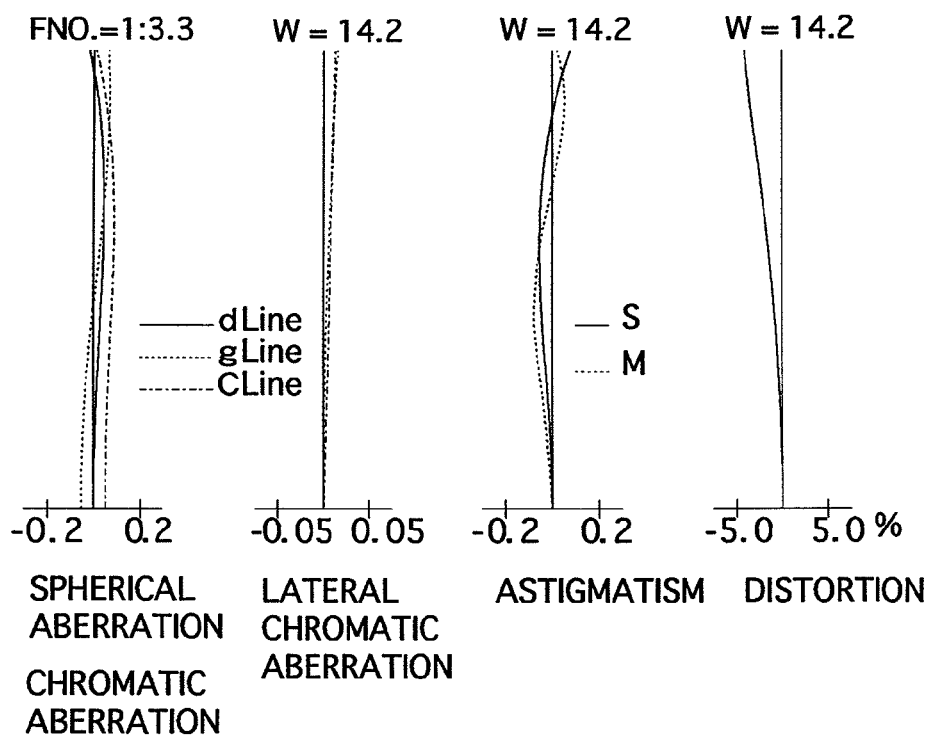
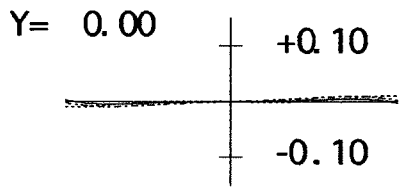
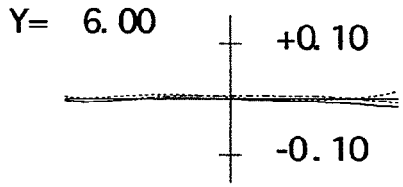
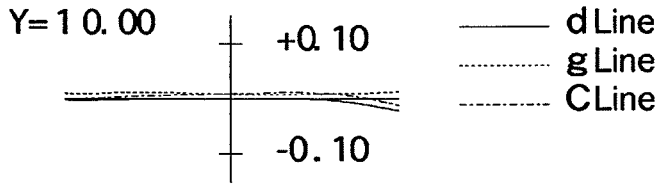

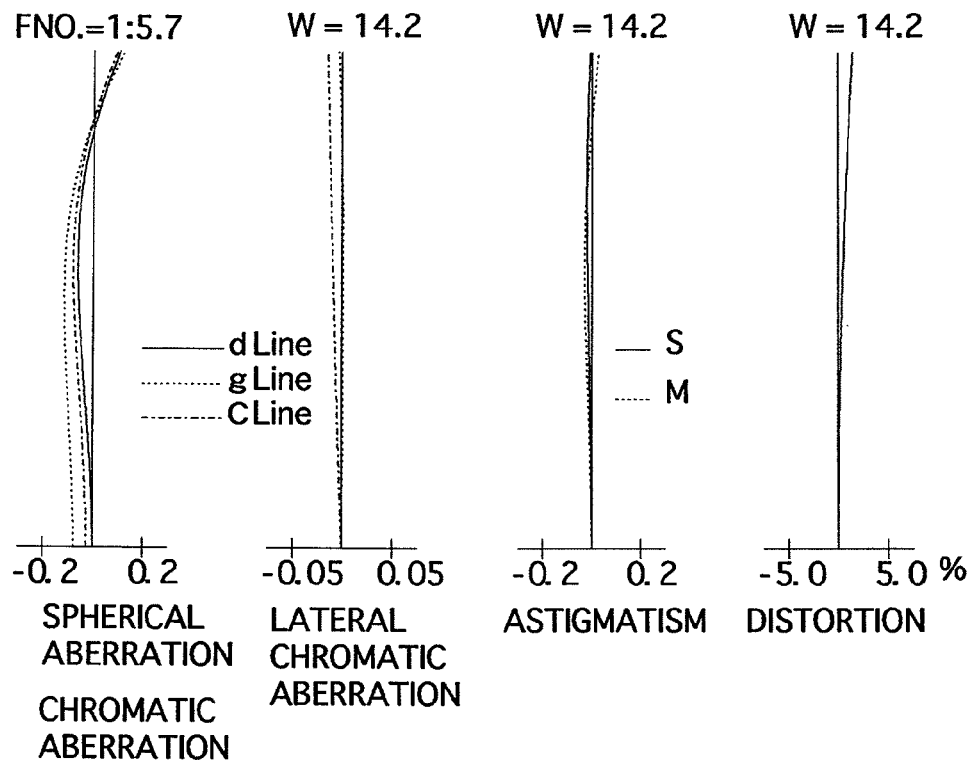
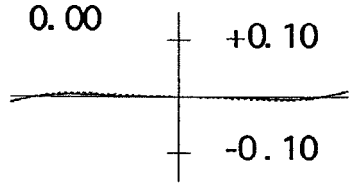
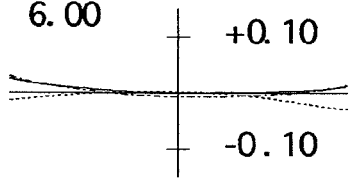
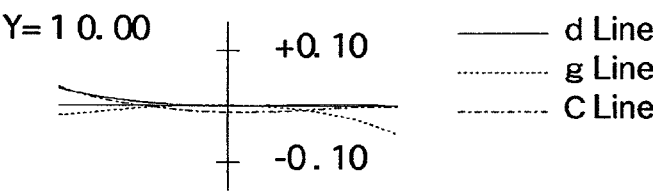

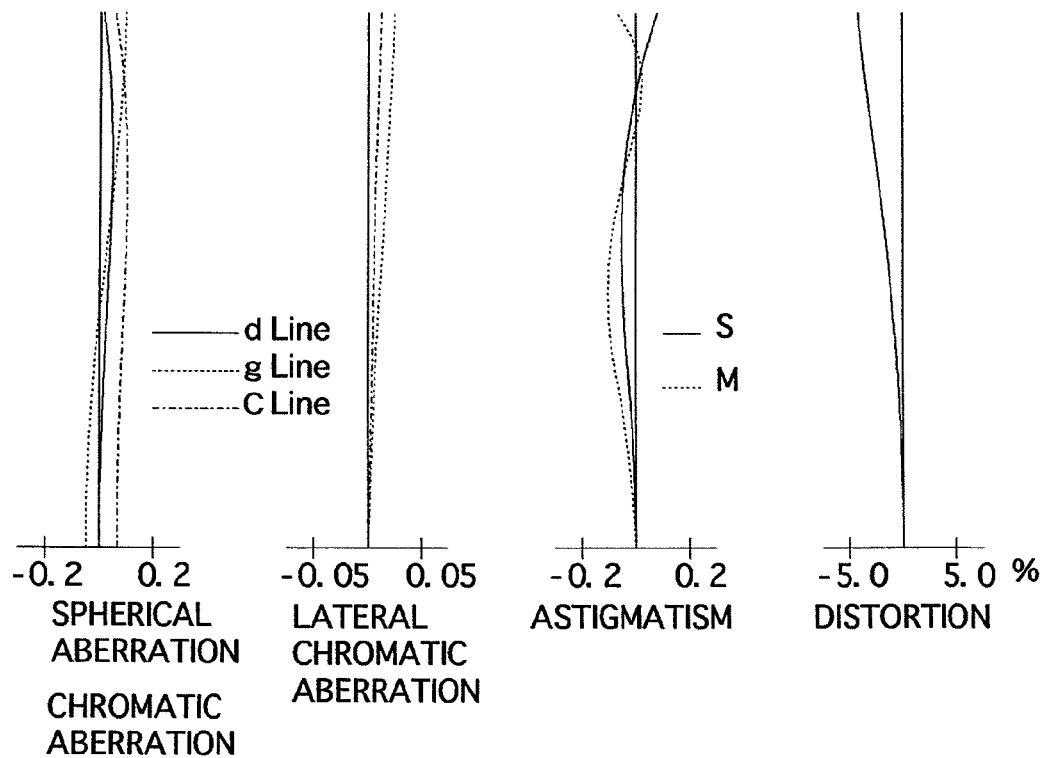
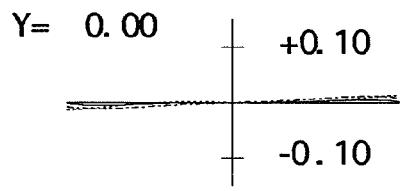
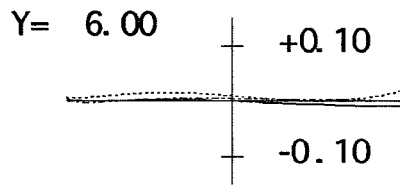
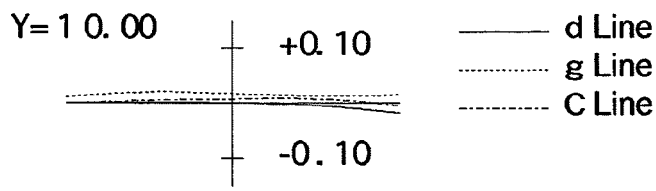

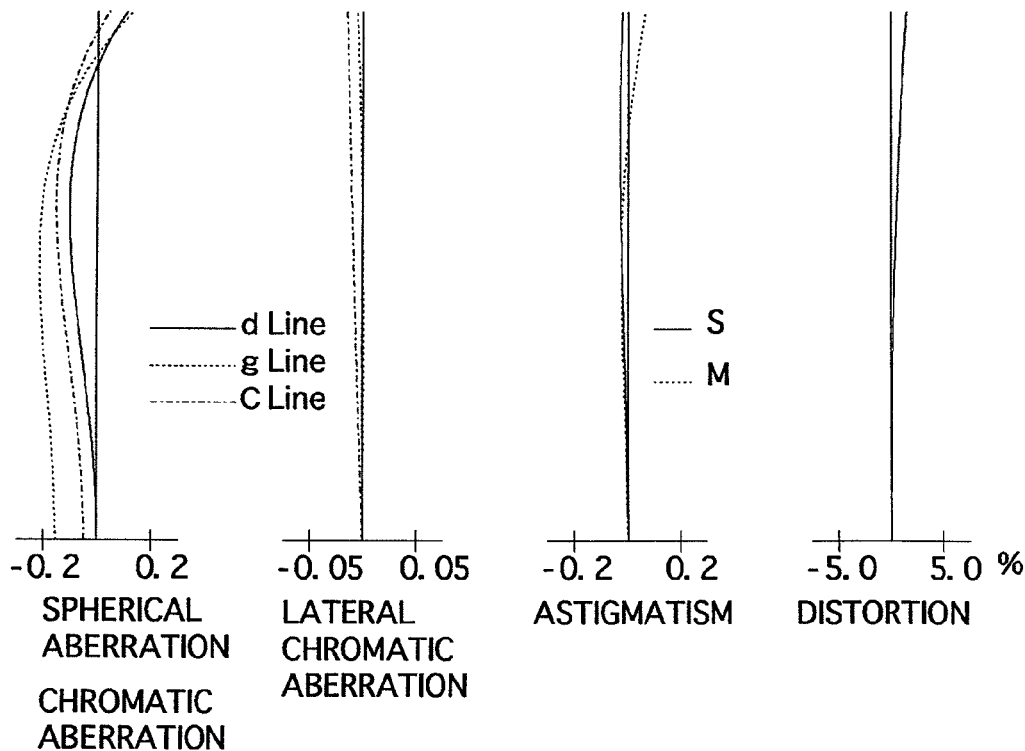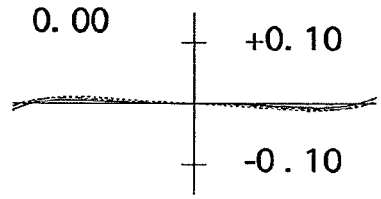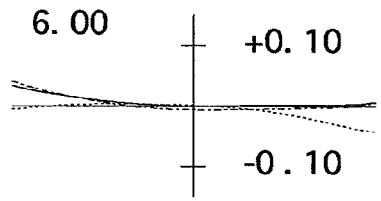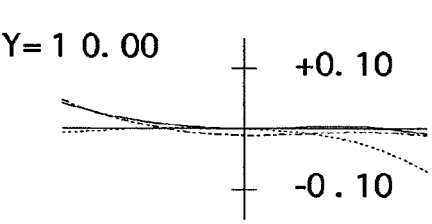

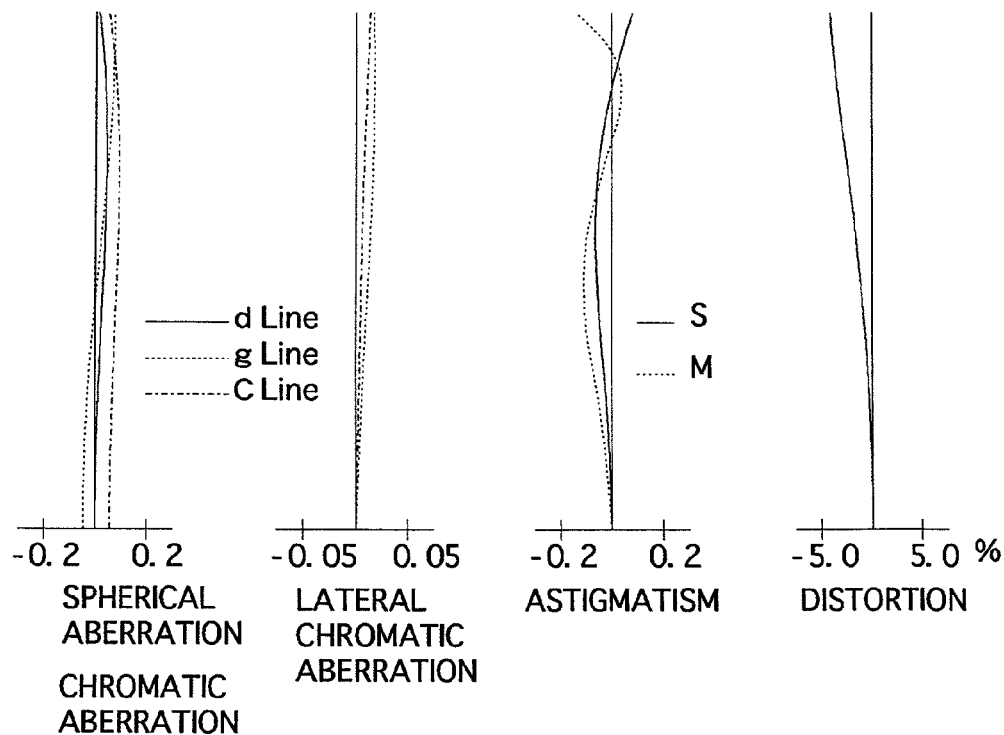
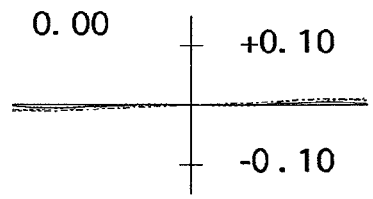
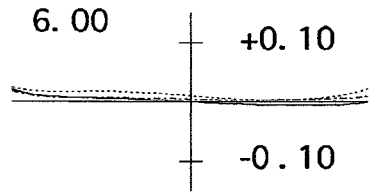
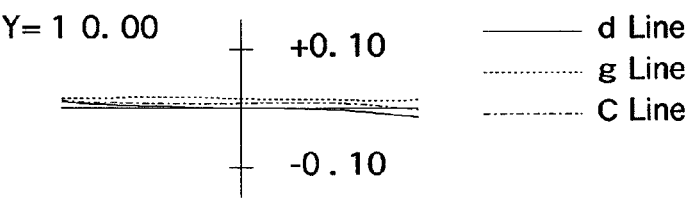

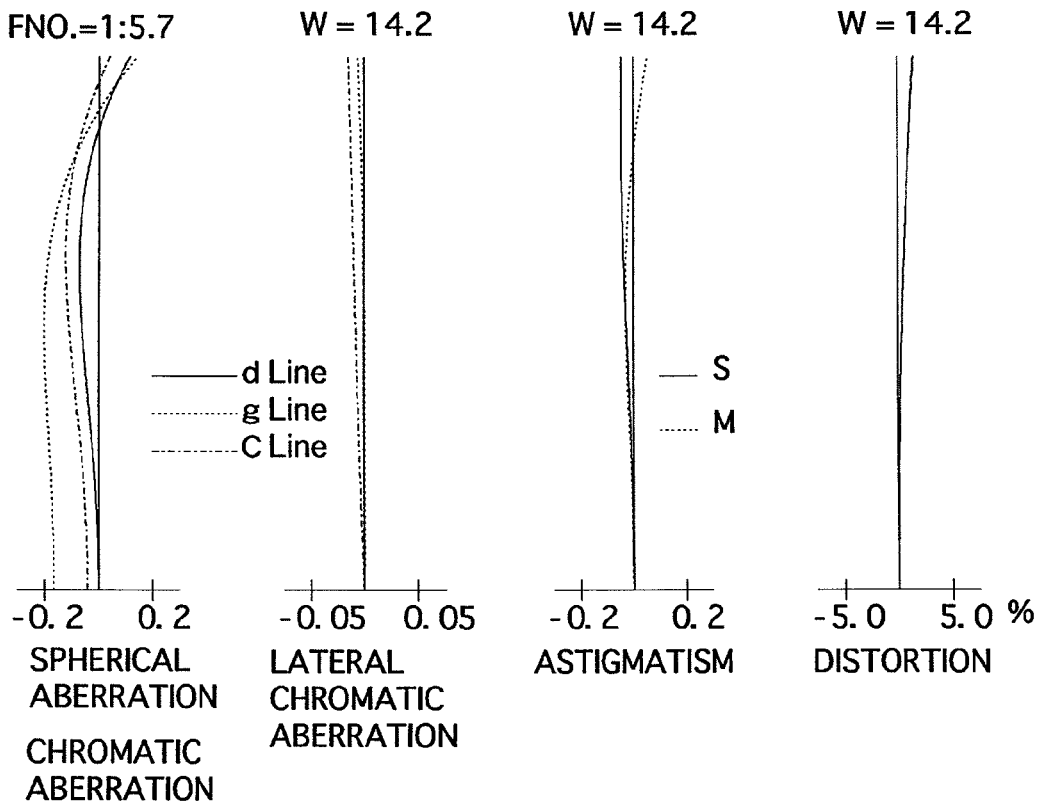
Fig. 20A  Fig. 20B  Fig. 20C  Fig. 20D
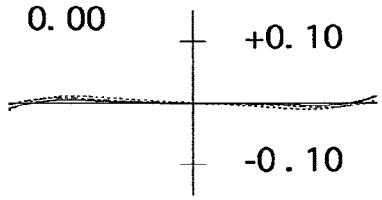
Fig. 21A  Y= 0.00
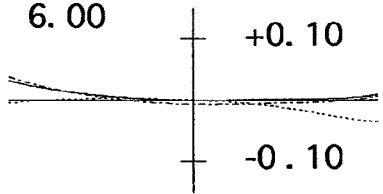
Fig. 21B  Y= 6.00
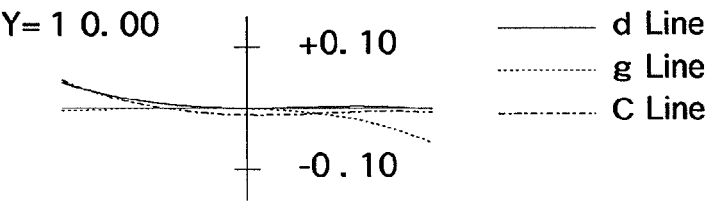
Fig. 21C  Y= 10.00

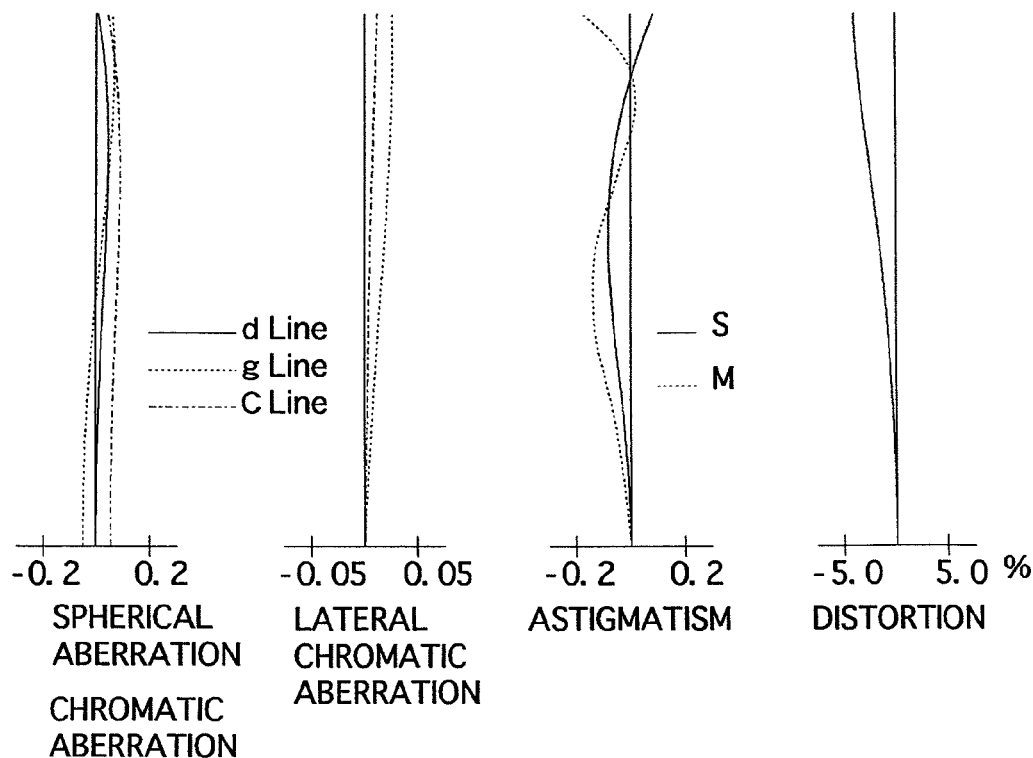
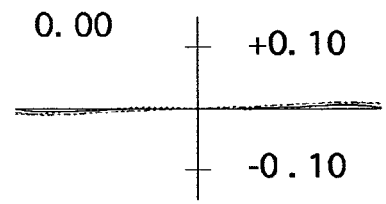
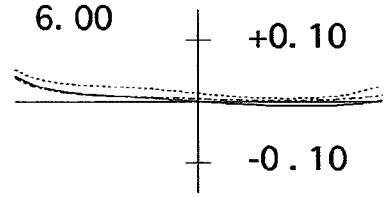
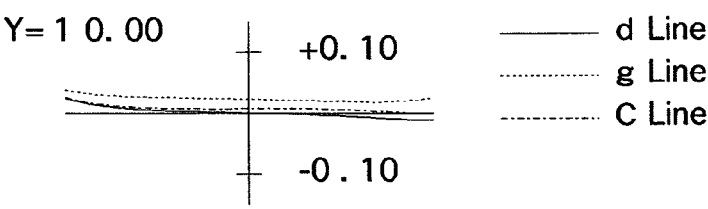

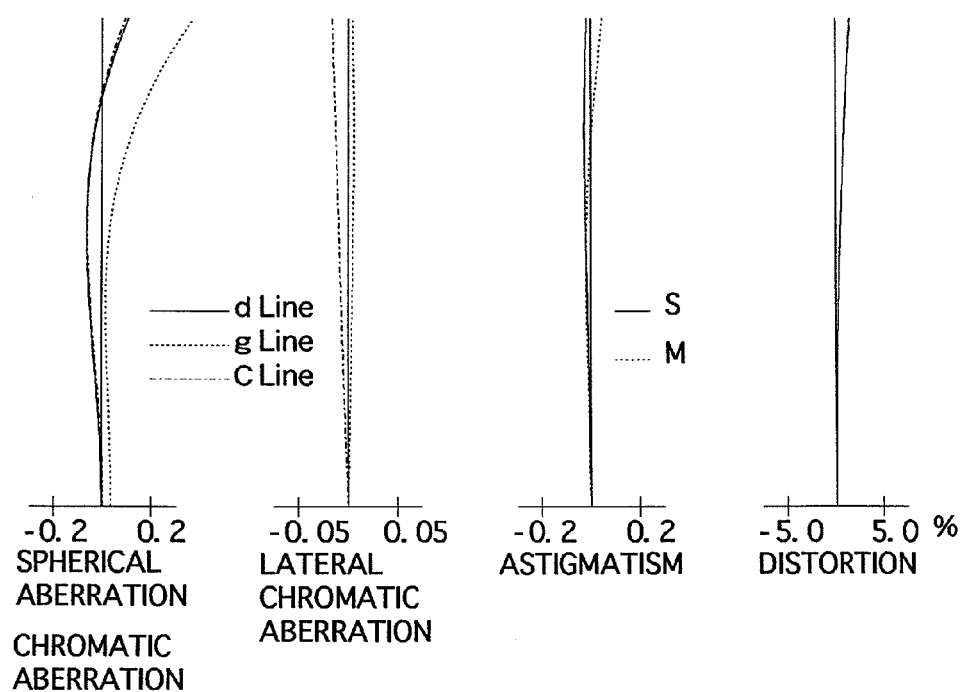
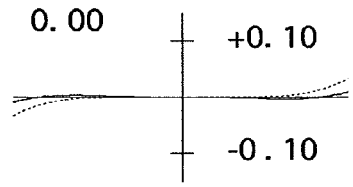
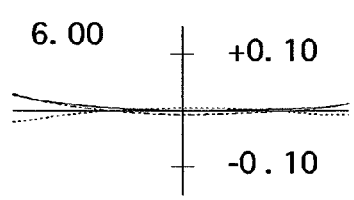
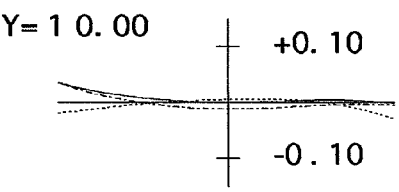

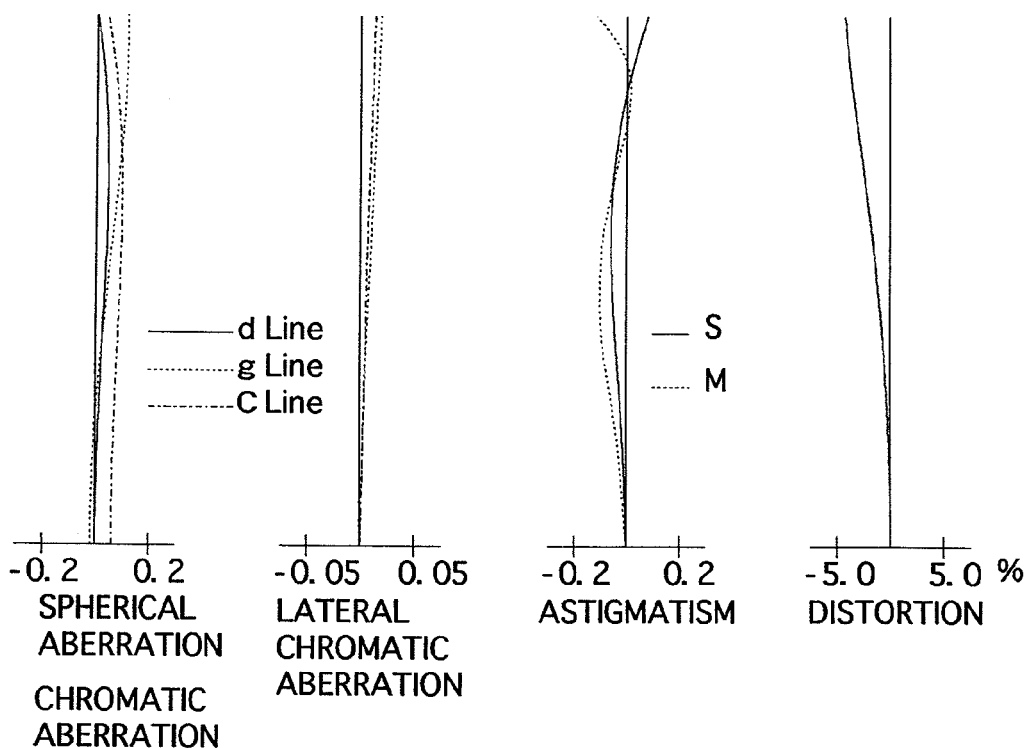
Fig. 29A FNO.=1:3.3 — SPHERICAL ABERRATION CHROMATIC ABERRATION
Fig. 29B W = 14.2 — LATERAL CHROMATIC ABERRATION
Fig. 29C W = 14.2 — ASTIGMATISM
Fig. 29D W = 14.2 — DISTORTION
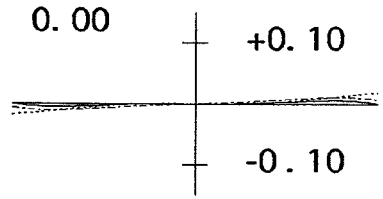
Fig. 30A Y= 0.00
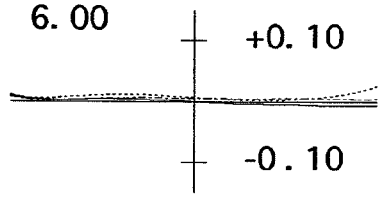
Fig. 30B Y= 6.00
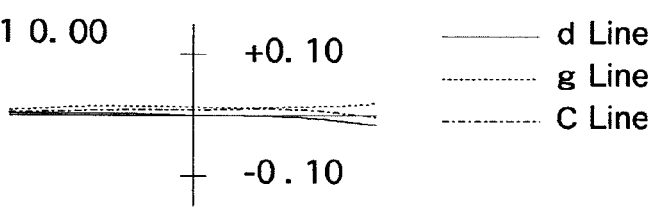
Fig. 30C Y= 10.00

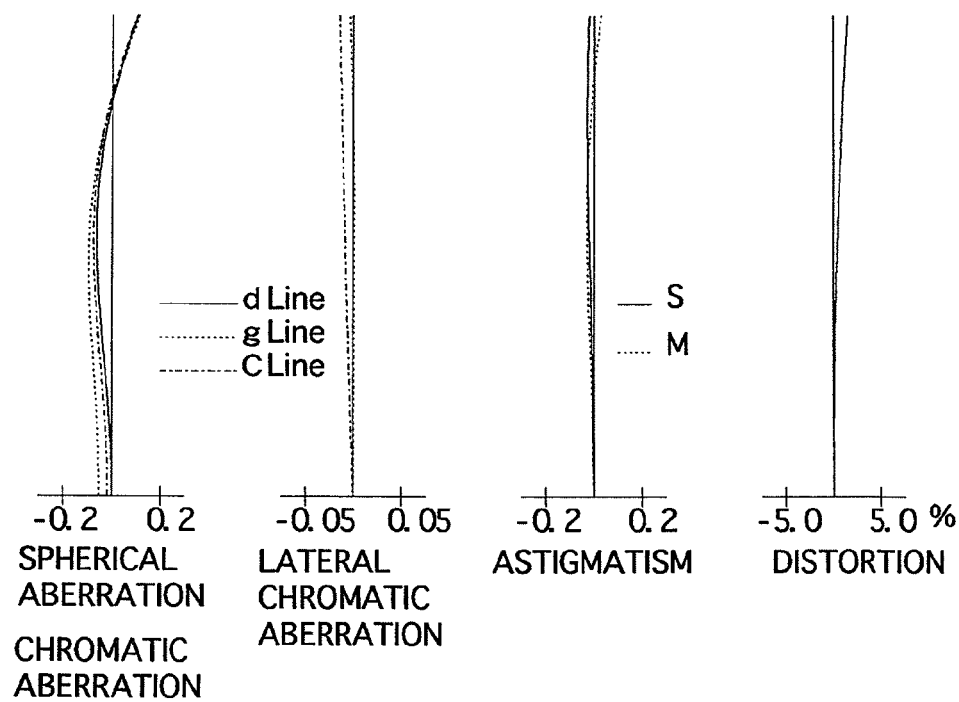
Fig. 32A FNO.=1:5.7 — SPHERICAL ABERRATION CHROMATIC ABERRATION (d Line, g Line, C Line)
Fig. 32B W = 14.2 — LATERAL CHROMATIC ABERRATION
Fig. 32C W = 14.2 — ASTIGMATISM (S, M)
Fig. 32D W = 14.2 — DISTORTION
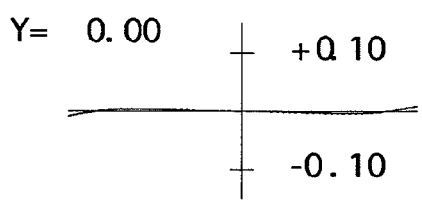
Fig. 33A  Y= 0.00
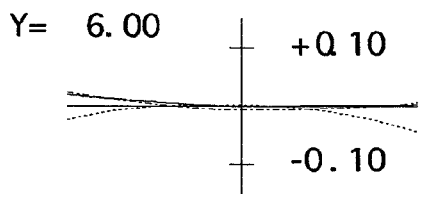
Fig. 33B  Y= 6.00
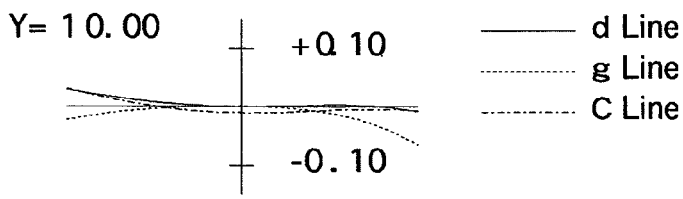
Fig. 33C  Y= 10.00
— d Line
······· g Line
─·─· C Line

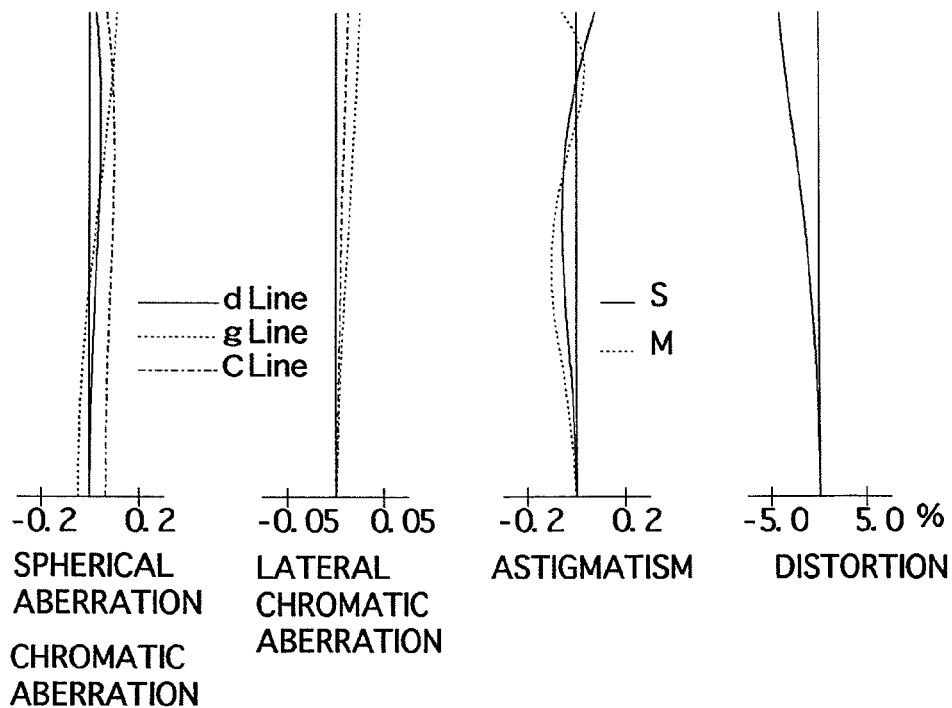
Fig. 35A FNO.=1:3.3 — SPHERICAL ABERRATION CHROMATIC ABERRATION
Fig. 35B W = 14.2 — LATERAL CHROMATIC ABERRATION
Fig. 35C W = 14.2 — ASTIGMATISM
Fig. 35D W = 14.2 — DISTORTION
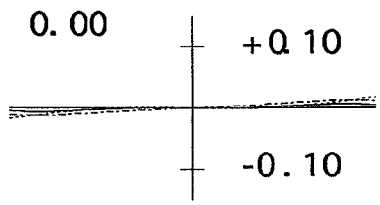
Fig. 36A Y= 0.00
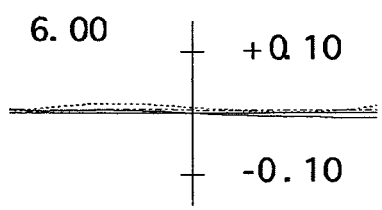
Fig. 36B Y= 6.00
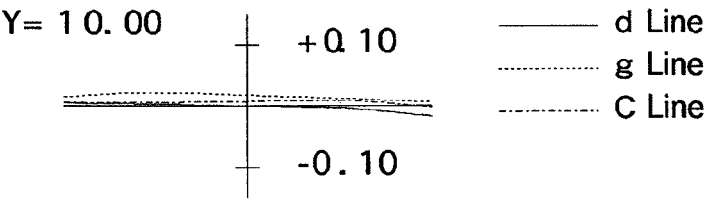
Fig. 36C Y= 10.00

ZOOM LENS SYSTEM

BACKGROUND OF THE INVENTION

1. Field of the Invention

The present invention relates to a high zoom-ratio zoom lens system having a favorable high zoom-ratio exceeding 13:1 for use in a single-lens reflex (SLR) camera, and especially for use in a digital SLR camera.

2. Description of Related Art

As examples of a high zoom-ratio zoom lens system having a zoom ratio exceeding 10:1 to 13:1, a four-lens-group zoom lens system including a positive lens group, a negative lens group, a positive lens group and a positive lens group, in this order from the object, and a five-lens-group zoom lens system including a positive lens group, a negative lens group, a positive lens group, a negative lens group and a positive lens group, in this order from the object, are known in the art. These zoom lens systems are proposed in, for example, Japanese Unexamined Patent Publication Nos. 2008-304952, 2006-284763, 2006-106191, and 2008-3195.

In the high zoom-ratio zoom lens system taught in Japanese Unexamined Patent Publication Nos. 2008-304952, 2006-284763 and 2006-106191, the zoom ratio is approximately 10:1, and the focal length at the long focal length extremity is approximately 200 mm, which is somewhat short.

In the high zoom-ratio zoom lens system taught in Japanese Unexamined Patent Publication No. 2008-3195, the zoom ratio is approximately 13:1; however, the focal length at the long focal length extremity is approximately 250 mm, and the f-number is 6.3, which is slow.

SUMMARY OF THE INVENTION

The present invention provides an optically superior high zoom-ratio zoom lens system having a zoom ratio exceeding 13:1, having a focal length of 350 mm at the long focal length extremity, achieving an f-number of 5.6, and having a half angle-of-view of approximately 60° at the short focal length extremity.

According to an aspect of the present invention, there is provided a high zoom-ratio zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group), and a fourth lens group having a positive refractive power (hereinafter, a positive fourth lens group), in this order from the object.

Upon zooming from the short focal length extremity to the long focal length extremity, the distance between the positive first lens group and the negative second lens group increases, and the distance between the negative second lens group and the positive third lens group decreases.

The positive third lens group includes a positive first sub-lens group and a negative second sub-lens group, in this order from the object.

The positive first sub-lens group includes a positive lens element provided at the most object-side thereof and a cemented lens provided at the most image-side thereof.

The cemented lens includes a positive lens element and a negative lens element, in this order from the object.

The high zoom-ratio zoom lens system satisfies the following conditions:

$$0.3 < f3a/f31 < 0.6 \quad (1)$$

$$-0.15 < f3a/f3PN < 0.1 \quad (2)$$

wherein f3a designates the focal length of the positive first sub-lens group;

f31 designates the focal length of the positive lens element provided at the most object-side of the positive first sub-lens group; and f3PN designates the focal length of the cemented lens provided at the most image-side of the positive first sub-lens group.

According to another aspect of the present invention, there is provided a high zoom-ratio zoom lens system including a positive first lens group, a negative second lens group, a positive third lens group, and a positive fourth lens group, in this order from the object.

Upon zooming from the short focal length extremity to the long focal length extremity, the distance between the positive first lens group and the negative second lens group increases, and the distance between the negative second lens group and the positive third lens group decreases.

The positive third lens group includes a positive first sub-lens group and a negative second sub-lens group, in this order from the object.

The positive first sub-lens group includes a cemented lens provided at the most image-side thereof and at least two positive lens elements on the object side of the cemented lens.

The cemented lens includes a positive lens element and a negative lens element, in this order from the object.

The high zoom-ratio zoom lens system satisfies the following conditions:

$$0.3 < f3a/f3p < 0.7 \quad (3)$$

$$-0.15 < f3a/f3PN < 0.1 \quad (2)$$

wherein f3a designates the focal length of the positive first sub-lens group;

f3p designates the focal length of a positive lens element having the strongest refractive power among the at least two positive lens elements on the object side of the cemented lens; and f3PN designates the focal length of the cemented lens provided at the most image-side of the positive first sub-lens group.

The negative second lens group is preferably constituted by five lens elements, such as a negative lens element, a negative lens element, a positive lens element, a negative lens element and a negative lens element, in this order from the object.

The negative second lens group is preferably constituted by a negative lens element, a negative lens element and a positive lens element, in this order from the image. Each of the two negative lens elements has a concave surface facing toward the object.

The negative second lens group is preferably constituted by a negative meniscus lens element having the convex surface facing toward the object, a biconcave negative lens element, a cemented lens including a biconvex positive lens element and a negative lens element having a concave surface facing toward the object, and a negative lens element having a concave surface facing toward the object, in this order from the object.

The high zoom-ratio zoom lens system satisfies the following condition:

$$2.5 < f1/R2F < 5.0 \quad (4)$$

wherein f1 designates the focal length of the positive first lens group; and

R2F designates the radius of curvature of the most object-side surface of the negative second lens group.

A positive lens element can be incorporated into said negative second lens group.

The positive first sub-lens group 3a and the negative second sub-lens group 3b can be arranged to maintain a fixed distance therebetween when zooming is performed.

In addition to the above explained-arrangement of setting a fixed distance between the positive first sub-lens group 3a and the negative second sub-lens group 3b (i.e., a four-lens-group arrangement) when zooming is performed, the positive first sub-lens group 3a and the negative second sub-lens group 3b can be arranged to vary the distance therebetween (i.e., a five-lens-group arrangement) when zooming is performed.

According to the four-lens-group arrangement, a mechanism for moving the lens groups can advantageously be simplified.

Also in the four-lens-group arrangement, the lens elements of the positive third lens group G3 can be defined as the positive first sub-lens group 3a and the negative second sub-lens group 3b based on the following standards 1 through 3:

1. where the longest distance between lens elements in the positive third lens group G3 is defined as the boundary; and the object-side of the boundary is the positive first sub-lens group 3a, and the image-side of the boundary is the negative second sub-lens group 3b;

2. the most image-side lens element (a positive lens element) of the positive third lens group G3 and a lens element (a negative lens element) thereof next to the most image-side positive lens element is defined as the negative second sub-lens group 3b, and other lens elements of the positive third lens group G3 are defined as the positive first sub-lens group 3a; and, the two lens elements of the negative second sub-lens group 3b can be formed as a cemented lens;

3. four lens elements from the object is defined as the positive first sub-lens group 3a, and other lens elements of the positive third lens group G3 are defined as the negative second sub-lens group 3b; and, the four positive lens elements constituting the positive first sub-lens group 3a include a positive lens element, a positive lens element, a positive lens element and a negative lens element, in this order from the object.

The present disclosure relates to subject matters contained in Japanese Patent Application No. 2009-124477 (filed on May 22, 2009) and Japanese Patent Application No. 2010-111656 (filed on May 14, 2010) which are expressly incorporated herein in their entirety.

BRIEF DESCRIPTION OF THE DRAWINGS

The present invention will be discussed below in detail with reference to the accompanying drawings, in which:

FIGS. 2A, 2B, 2C and 2D show aberrations occurred in the lens arrangement shown in FIG. 1;

FIGS. 3A, 3B and 3C show transverse aberration occurred in the lens arrangement shown in FIG. 1;

FIGS. 5A, 5B, 5C and 5D show aberrations occurred in the lens arrangement shown in FIG. 4;

FIGS. 6A, 6B and 6C show transverse aberration of the lens arrangement shown in FIG. 4;

FIGS. 8A, 8B, 8C and 8D show aberrations occurred in the lens arrangement shown in FIG. 7;

FIGS. 9A, 9B and 9C show transverse aberration occurred in the lens arrangement shown in FIG. 7;

FIGS. 11A, 11B, 11C and 11D show aberrations occurred in the lens arrangement shown in FIG. 10;

FIGS. 12A, 12B and 12C show transverse aberration of the lens arrangement shown in FIG. 10;

FIGS. 14A, 14B, 14C and 14D show aberrations occurred in the lens arrangement shown in FIG. 13;

FIGS. 15A, 15B and 15C show transverse aberration occurred in the lens arrangement shown in FIG. 13;

FIGS. 17A, 17B, 17C and 17D show aberrations occurred in the lens arrangement shown in FIG. 16;

FIGS. 18A, 18B and 18C show transverse aberration of the lens arrangement shown in FIG. 16;

FIGS. 20A, 20B, 20C and 20D show aberrations occurred in the lens arrangement shown in FIG. 19;

FIGS. 21A, 21B and 21C show transverse aberration occurred in the lens arrangement shown in FIG. 19;

FIGS. 23A, 23B, 23C and 23D show aberrations occurred in the lens arrangement shown in FIG. 22;

FIGS. 24A, 24B and 24C show transverse aberration of the lens arrangement shown in FIG. 22;

FIGS. 26A, 26B, 26C and 26D show aberrations occurred in the lens arrangement shown in FIG. 25;

FIGS. 27A, 27B and 27C show transverse aberration occurred in the lens arrangement shown in FIG. 25;

FIGS. 29A, 29B, 29C and 29D show aberrations occurred in the lens arrangement shown in FIG. 28;

FIGS. 30A, 30B and 30C show transverse aberration of the lens arrangement shown in FIG. 28;

FIGS. 32A, 32B, 32C and 32D show aberrations occurred in the lens arrangement shown in FIG. 31;

FIGS. 33A, 33B and 33C show transverse aberration occurred in the lens arrangement shown in FIG. 31;

FIGS. 35A, 35B, 35C and 35D show aberrations occurred in the lens arrangement shown in FIG. 34;

FIGS. 36A, 36B and 36C show transverse aberration of the lens arrangement shown in FIG. 34;

DESCRIPTION OF THE EMBODIMENTS

The high zoom-ratio zoom lens system of the present invention, as shown in the zoom diagrams of FIGS. 37 through 40, includes a positive first lens group G1, a negative second lens group G2, a diaphragm S, a positive third lens group G3, and a positive fourth lens group G4, in this order from the object.

The positive third lens group G3 includes a positive first sub-lens group G3a and a negative second sub-lens group G3b, in this order from the object.

Figure 37:
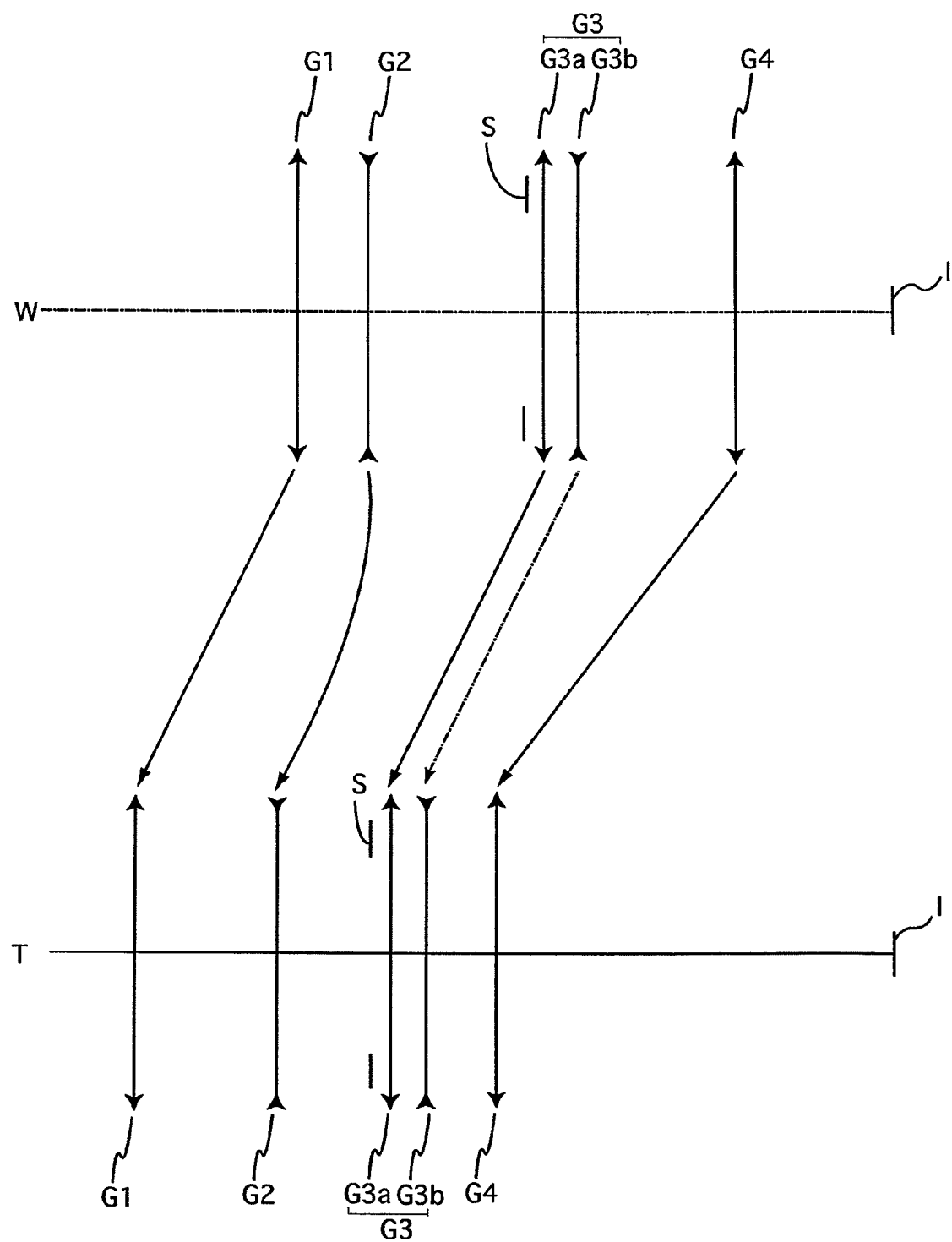
FIG. 37 shows a first schematic lens-group moving paths of the high zoom-ratio zoom lens system according to the present invention.
Figure 39:
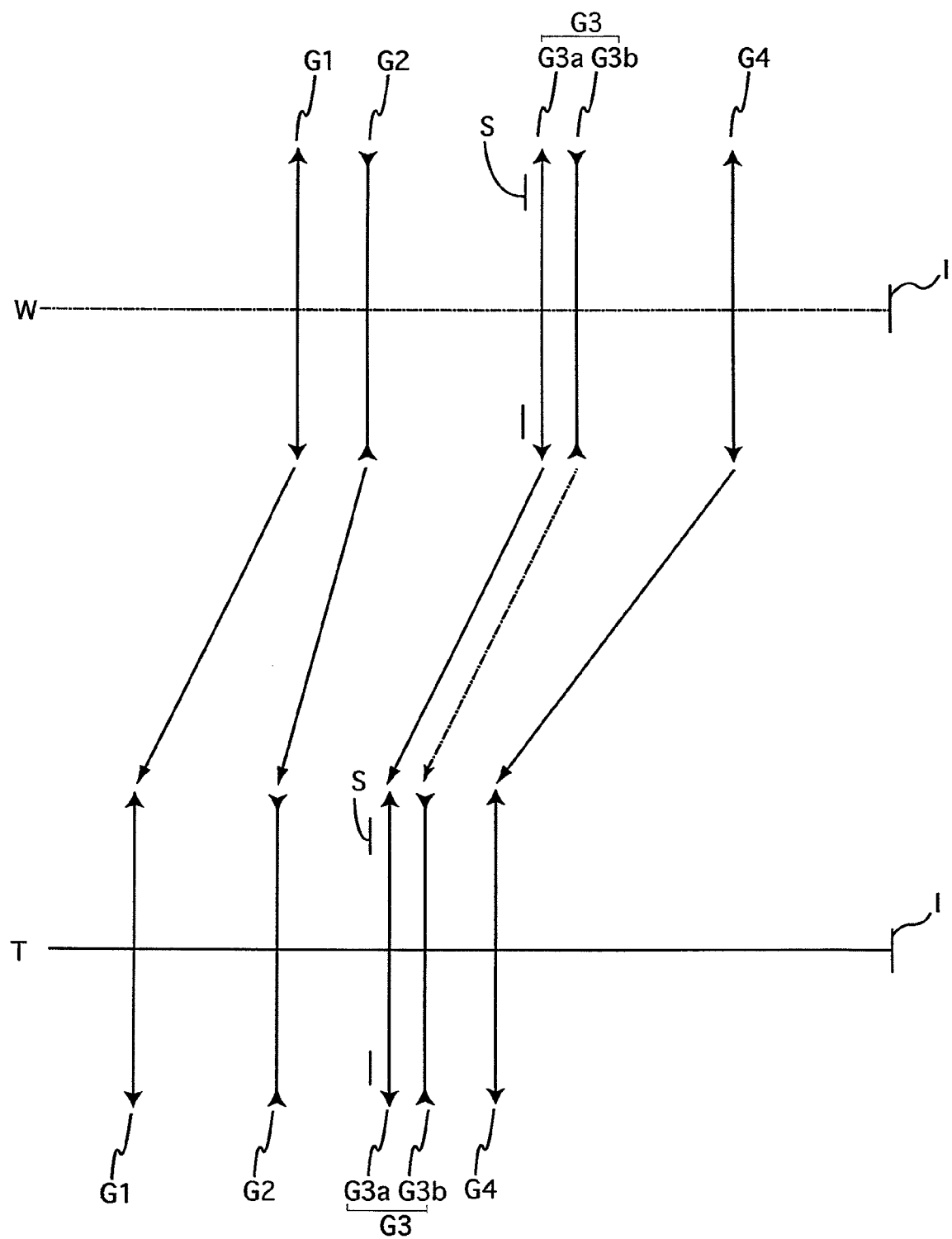
FIG. 39 shows a third schematic lens-group moving paths of the high zoom-ratio zoom lens system according to the present invention.

As shown in FIG. 37 (Embodiment 1) FIG. 39 (Embodiment 5), the positive first sub-lens group G3a and the negative second sub-lens group G3b can be arranged to integrally move in the optical axis direction. In other words, it is understood that the high zoom-ratio zoom lens system includes a four-lens-group arrangement, i.e., a positive first lens group, a negative second lens group, a positive third lens group and a positive fourth lens group, in this order from the object.

Figure 38:
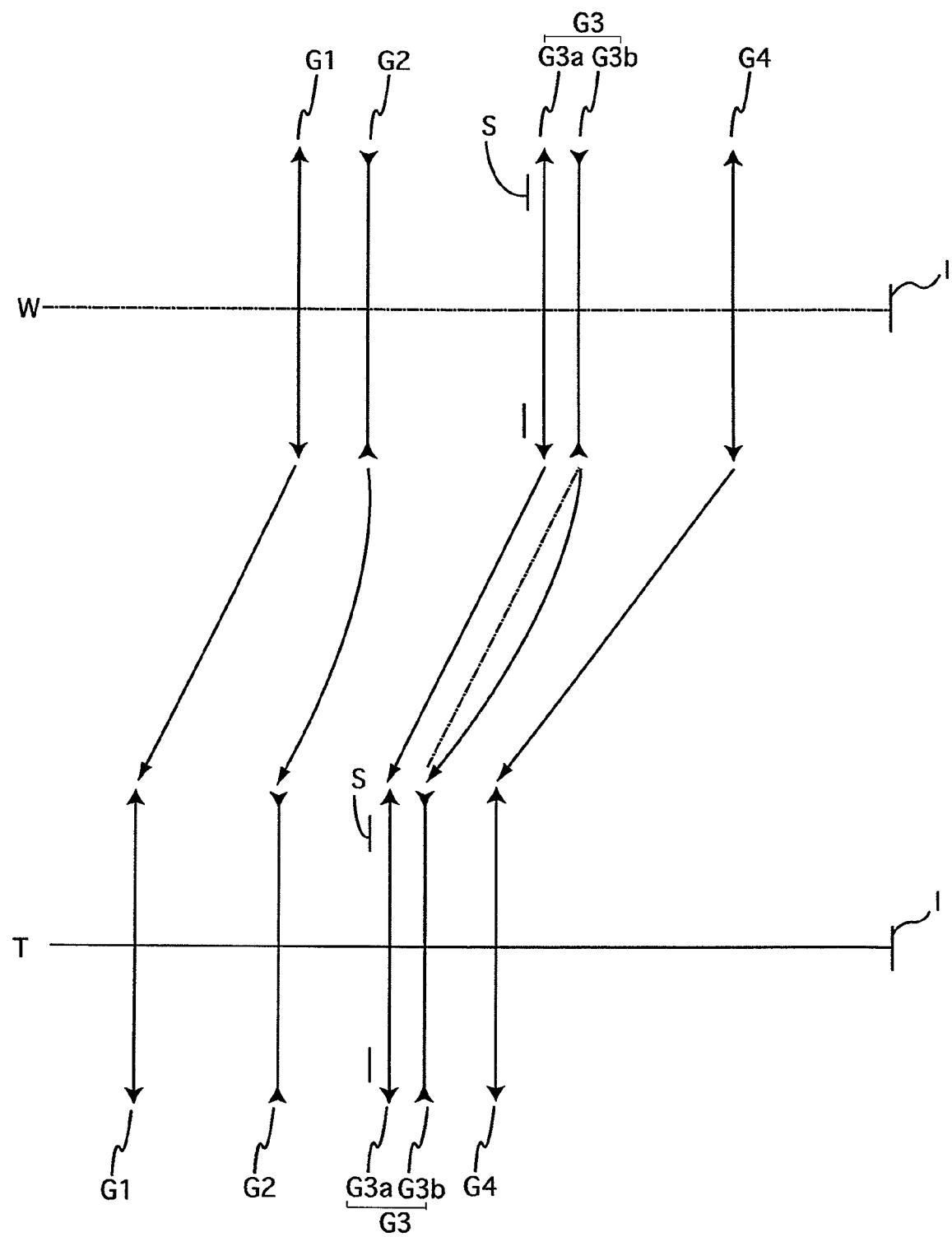
FIG. 38 shows a second schematic lens-group moving paths of the high zoom-ratio zoom lens system according to the present invention.
Figure 40:
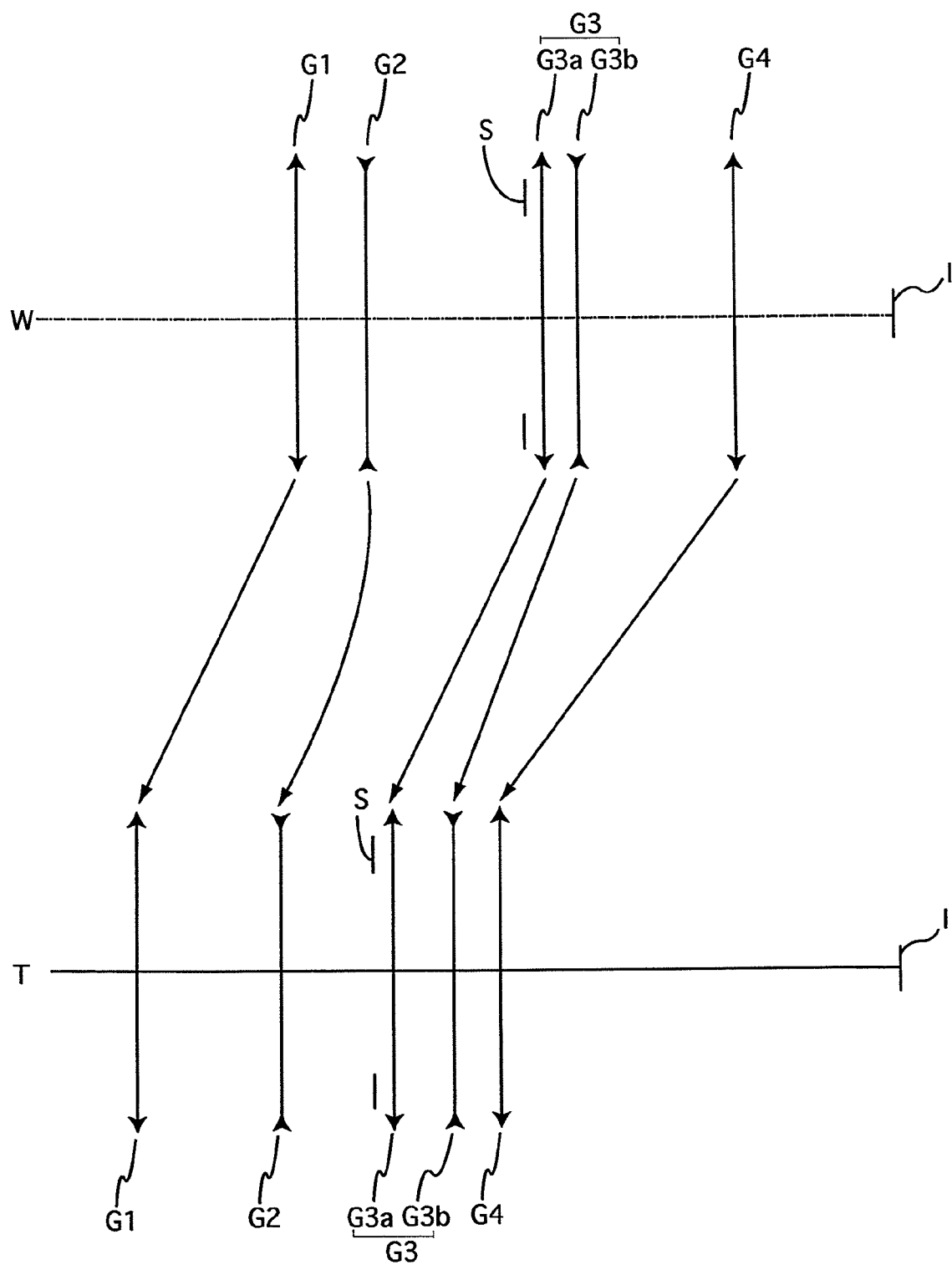
FIG. 40 shows a fourth schematic lens-group moving paths of the high zoom-ratio zoom lens system according to the present invention.

As shown in FIG. 38 (Embodiments 2, 3 and 4) and FIG. 40 (Embodiment 6), the positive first sub-lens group G3a and the negative second sub-lens group G3b can be arranged to move relative to each other in the optical axis direction. In other words, it is understood that the high zoom-ratio zoom lens system includes a five-lens-group arrangement, i.e., a positive first lens group, a negative second lens group, a positive third lens group, a negative fourth lens group and a positive fifth lens group, in this order from the object.

In each of Embodiments 1 to 6, upon zooming from the short focal length extremity (S) to the long focal length extremity (L), the distance between the positive first lens group G1 and the negative second lens group G2 increases, and the distance between the negative second lens group G2 and the positive third lens group G3 decreases.

More specifically, upon zooming from the short focal length extremity (S) to the long focal length extremity (L), the positive first lens group G1 monotonically moves toward the object, the negative second lens group G2 moves (in its entirety) toward the object, the positive third lens group G3 moves (in its entirety) toward the object, and the positive fourth lens group monotonically moves toward the object.

In Embodiments 2, 3, 4 and 6 in which the positive first sub-lens group G3a and the negative second sub-lens group G3b can be arranged to move relative to each other in the optical axis direction, the positive first sub-lens group G3a and the negative second sub-lens group G3b maintain substantially the same distance therebetween at the short focal length extremity and the long focal length extremity; and the distance between the positive first sub-lens group G3a and the negative second sub-lens group G3b increases toward intermediate focal length positions (see FIG. 38). Alternatively, the distance between the positive first sub-lens group G3a and the negative second sub-lens group G3b monotonically increases upon zooming from the short focal length extremity to the long focal length extremity (see FIG. 40).

The diaphragm S is provided between the negative second lens group G2 and the positive third lens group G3, and integrally moves, in the optical axis direction, with the positive third lens group G3 (or, the positive first sub-lens group G3a).

Focusing is performed by the second lens group G2. "I" designates an imaging plane.

The high zoom-ratio zoom lens system of the present invention achieves not only a zoom ratio exceeding 13:1 and a longer focal length at the long focal length extremity, but also a small (fast) f-number.

In the high zoom-ratio zoom lens system of the four-lens-group arrangement (a positive lens group, a negative lens group, a positive lens group and a positive lens group in this order from the object) and that of the five-lens-group arrangement (a positive lens group, a negative lens group, a positive lens group, a negative lens group and a positive lens group in this order from the object), the correcting of spherical aberration, coma and chromatic aberration at the long focal length extremity is the most crucial factor to be solved. In order to correct these aberrations, whether the correcting of aberrations in the positive third lens group G3 is well performed is important.

The positive third lens group G3 includes the positive first sub-lens group G3a and the negative second sub-lens group G3b, in this order from the object.

As shown in each of Embodiments 1 to 6, the positive first sub-lens group G3a includes a positive lens element at the most object-side thereof, and a cemented lens having a positive lens element and a negative lens element at the most image-side thereof. The positive lens element and the negative lens element constituting the cemented lens are arranged in this order from the object. Arrangement of lens elements between the most object-side positive lens element and the cemented lens at the most image-side of the positive first sub-lens group G3a has a certain amount of freedom, e.g., a single positive lens element can be provided between the most object-side positive lens element and the cemented lens at the most image-side of the positive first sub-lens group G3a.

The negative second sub-lens group G3b includes a cemented lens having a negative lens element and a positive lens element, in this order from the object.

The most object-side positive lens element of positive third lens group G3 (the positive first sub-lens group G3a) very closely relates to the occurrence of spherical aberration. Namely, if the refractive power of the most object-side positive lens element is too strong, spherical aberration largely occurs.

Condition (1) specifies the focal length (f31) of the most object-side positive lens element of positive third lens group G3 (the positive first sub-lens group G3a) in relation to the focal length of the positive first sub-lens group (f3a), which indicates that the most object-side positive lens element bears approximately half of the refractive power burden of the positive first sub-lens group G3a.

If the refractive power of the most object-side positive lens element is made stronger to the extent that f3a/f31 exceeds the upper limit of condition (1), uncorrectable spherical aberration occurs.

If the refractive power of the most object-side positive lens element is made weaker to the extent that f3a/f31 exceeds the lower limit of condition (1), the refractive power of the subsequent lens elements behind the most object-side positive lens element becomes stronger, higher order spherical aberrations easily occur. Moreover, the most object-side positive lens element cannot sufficiently converge the light bundle diverging from the negative second lens group G2. As a result, the lens diameter becomes larger; and, the diameter of the light bundle also becomes larger, so that higher order spherical aberration even more easily occurs.

In other words, the positive first sub-lens group G3a includes a cemented lens provided at the most image-side thereof and at least two positive lens elements on the object side of the cemented lens. The cemented lens includes a positive lens element and a negative lens element, in this order from the object.

A positive lens element having the strongest refractive power (hereinafter, the strongest-positive lens element with respect to condition (3)), in the positive first sub-lens group G3a, very closely relates to the occurrence of spherical aberration. Namely, if the refractive power of the positive lens element is too strong, spherical aberration largely occurs.

If the refractive power of the strongest-positive lens element is made stronger to the extent that f3a/f3p exceeds the upper limit of condition (3), uncorrectable spherical aberration occurs.

If the refractive power of the strongest-positive lens element is made weaker to the extent that f3a/f3p exceeds the lower limit of condition (3), the refractive power of the subsequent lens elements behind the strongest-positive lens element becomes stronger, high order spherical aberrations easily occur. Moreover, the strongest-positive lens element cannot sufficiently converge the light bundle diverging from the negative second lens group G2. As a result, the lens diameter becomes larger; and, the diameter of the light bundle also becomes larger, so that higher order spherical aberration even more easily occurs.

Furthermore, in order to effectively correct chromatic aberration while spherical aberration and coma are reduced, the cemented lens at the most image-side of the positive first sub-lens group G3a preferably satisfied Condition (2). The refractive power of the cemented lens as a whole can either be positive or negative.

If the positive refractive power of the cemented lens at the most image-side of the positive first sub-lens group G3a becomes stronger to the extent that f3a/f3PN exceeds the upper limit of condition (2), the correcting of chromatic aberration cannot sufficiently be done.

If the negative positive refractive power of the cemented lens at the most image-side of the positive first sub-lens group G3a becomes stronger to the extent that f3a/f3PN exceeds the lower limit of condition (2), the correcting of spherical aberration cannot suitably be done.

As explained, by satisfying conditions (1) and (2), or conditions (3) and (2), the positive third lens group G3 can correct spherical aberration in the positive direction, coma and chromatic aberration. Furthermore, spherical aberration in the negative direction and coma occur in the negative second lens group G2. Therefore spherical aberration in the negative direction and coma occurred in the negative second lens group G2 should also be suitably corrected so that spherical aberration in the positive direction and coma occurred in the positive third lens group G3 are not overcorrected.

In a conventional high zoom-ratio zoom lens system having four lens groups (i.e., a positive lens group, a negative lens group, a positive lens group and a positive lens group, in this order from the object) or, a high zoom-ratio zoom lens system having five lens groups (i.e., a positive lens group, a negative lens group, a positive lens group, a negative lens group and a positive lens group, in this order from the object), the negative second lens group G2 commonly includes a negative lens element, a negative lens element, a positive lens element and a negative lens element, in this order from the object (a four-lens-element arrangement), or, includes a negative lens element, a negative lens element, a positive lens element, a negative lens element and a positive lens element, in this order from the object (a five-lens-element arrangement).

On the other hand, the negative second lens group G2 of the present invention employs a five-lens-element arrangement with four negative lens elements, i.e., a negative lens element, a negative lens element, a positive lens element, a negative lens element and a negative lens element, in this order from the object. Due to this arrangement, light rays emitted from the negative second lens group G2 can gradually divert. Consequently, spherical aberration in the negative direction (especially high order aberrations) can be reduced.

Furthermore, the negative second lens group G2 can preferably incorporate a positive lens element. Collecting the positive refractive power of the negative second lens group G2 onto the only one positive lens element is advantageous for achieving the miniaturized and light-weight negative second lens group G2.

More specifically, the second lens group G2, as shown in each of Embodiments 1 to 6, can includes a negative meniscus lens element having the convex surface facing toward the object, a biconcave negative lens element, a cemented lens composed of a biconvex positive lens element and a negative lens element having a concave surface facing toward the object, and a negative lens element having a concave surface facing toward the object.

In the negative second lens, group G2, in order to diverge the axial light bundle from the negative second lens group G2 toward the positive third lens group G3, the arrangement of the three lens elements from the most image-side of the negative second lens group G2 is important. Therefore in the negative second lens group G2 of the present invention, as shown in each of Embodiments 1 to 6, a negative lens element, a negative lens element and a positive lens element, in this order from the image, are provided. The two negative lens elements preferably have a concave surface (an incident surface) facing toward the object. This is because the concave surface facing toward the object can increase the incident angle of light rays on the incident surface to a right angle. As a result, higher-order aberrations can be reduced.

In order attain a wider angle-of-view at the short focal length extremity, the most object-side lens element of the negative second lens group G2 preferably satisfies condition (4).

If f1/R2F exceeds the lower limit of condition (4), the incident angle of the peripheral light rays incident on the most object-side surface (surface No. 7) of the negative second lens group G2 becomes very larger at the short focal length extremity, and distortion, etc. largely occurs.

If f1/R2F exceeds the upper limit of condition (4), a sufficient negative refractive power cannot be provided in the most object-side negative lens element in the negative second lens group G2. Consequently, an excessive amount of negative refractive power needs to be provided in the other negative lens elements behind the most object-side negative lens element, so that spherical aberration at the long focal length extremity is overcorrected (i.e., spherical aberration in the negative direction increases).

It is possible to perform focusing by moving the front lens group (the positive first lens group G1) in the optical axis direction; however, since the first lens group G1 is heavy, it is disadvantageous to perform auto focusing (AF) operations by the heavy positive first lens group G1. On the other hand, focusing by the negative second lens group G2 is advantageous, since the negative second lens group G2 is light (not heavy), and the minimum photographing distance can be made shorter.

EMBODIMENTS

Specific embodiments will be herein discussed. The following embodiments correspond to when used in a digital SLR camera.

In the diagrams of chromatic aberration (axial chromatic aberration) represented by spherical aberration, the solid line and the two types of dotted lines respectively indicate spherical aberrations with respect to the d, g, C, F and e lines.

In the diagrams of lateral chromatic aberration, y designates the image height, the four types of dotted lines respectively indicate magnification with respect to the d, g, C, F and e lines; however, the d line as the base line coincides with the ordinate.

In the diagrams of astigmatism, Y designates the image height, S designates the sagittal image, and M designates the meridional image.

In the diagrams of distortion, Y designates the image height.

In the diagrams of transverse aberration, the solid line indicates spherical aberrations with respect to the d line.

In the tables, R designates the radius of curvature, d designates the lens-element thickness or a distance between lens elements (lens groups), Nd designates the refractive index of the d-line, and vd designates the Abbe number with respect to the d line, FNO. designates the F-number, f designates the focal length of the entire lens system, W designates the half angle-of-view (°), Y designates the image height, fB designates the back focal distance (the distance between the image-side surface of the most image-side cover glass to the imaging plane), L designates the length of the lens system (the distance from surface No. 1 to the imaging plane).

FNO., f, W, Y, fB, L and d (which changes according to focusing) are shown in the following order: "the short focal length extremity, an intermediate focal length, the long focal length extremity".

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
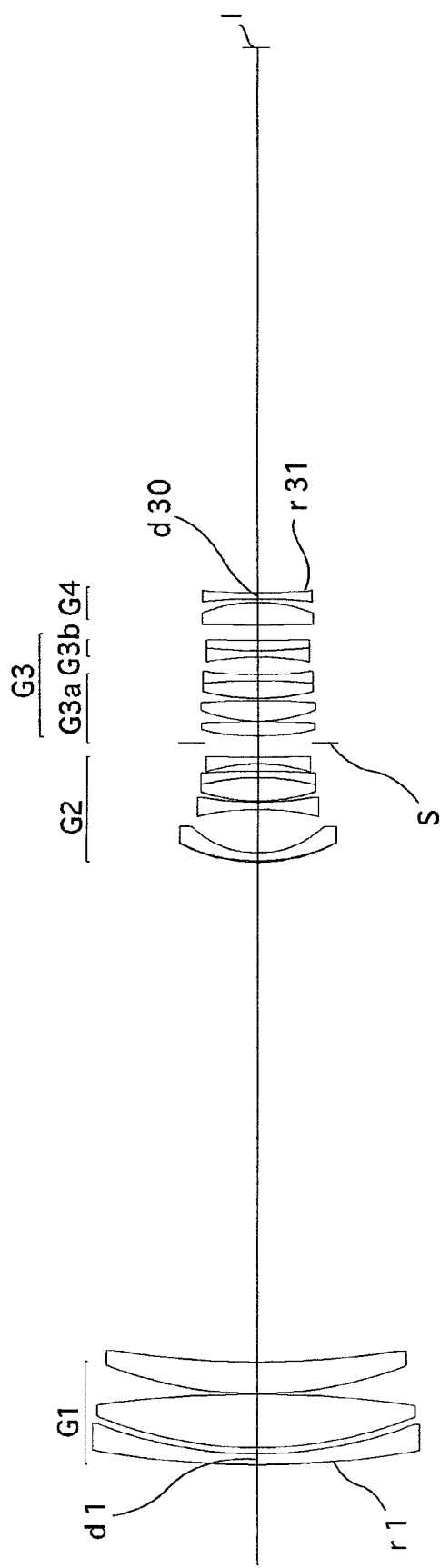
FIG. 1 shows a lens arrangement of a high zoom-ratio zoom lens system, according to a first embodiment of the present invention, at the long focal length extremity when an object at infinity is in an in-focus state.

FIG. 1 shows the lens arrangement of the high zoom-ratio zoom lens system, according to a first embodiment of the present invention, at the long focal length extremity when an object at infinity is in an in-focus state. FIGS. 2A through 2D show aberrations occurred in the lens arrangement shown in FIG. 1. FIGS. 3A through 3C show transverse aberration occurred in the lens arrangement shown in FIG. 1.

Figure 4:
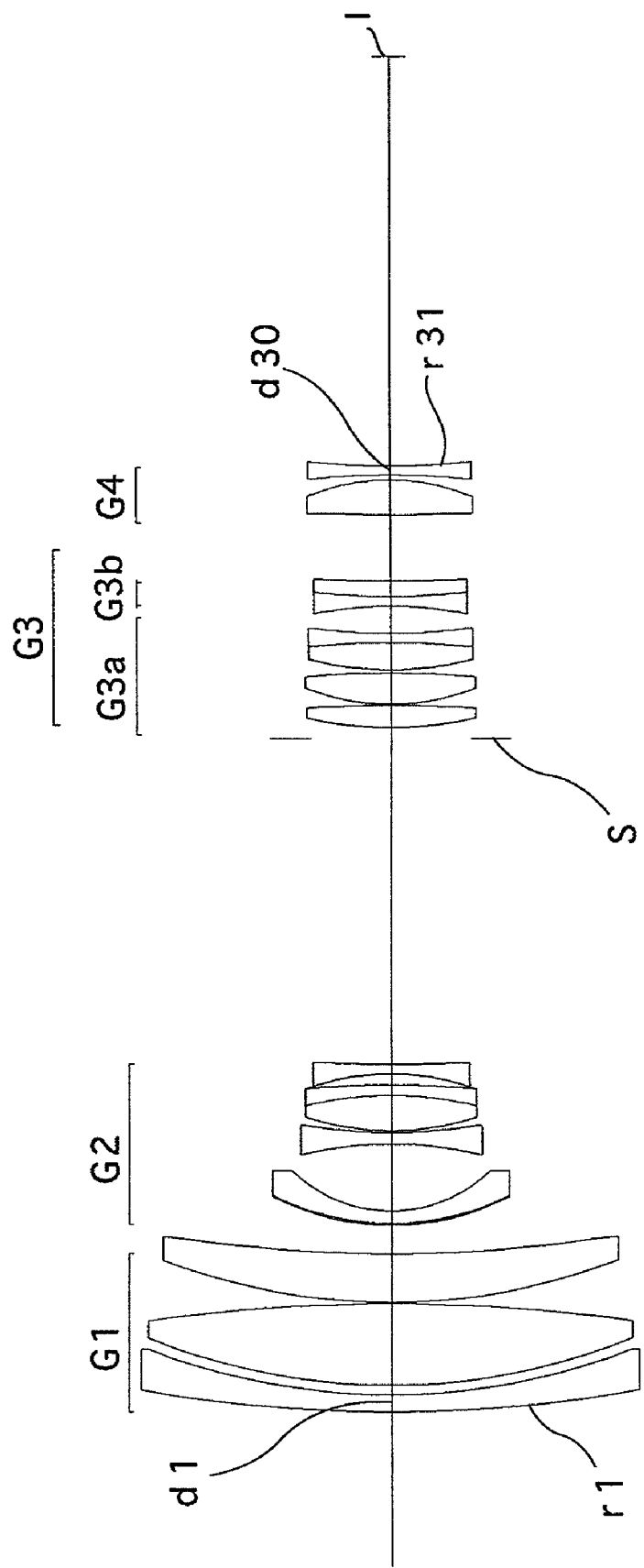
FIG. 4 shows a lens arrangement of the high zoom-ratio zoom lens system, according to the first embodiment of the present invention, at the short focal length extremity when an object at infinity is in an in-focus state.

FIG. 4 shows the lens arrangement of the high zoom-ratio zoom lens system, according to the first embodiment of the present invention, at the short focal length extremity when an object at infinity is in an in-focus state. FIGS. 5A through 5D show aberrations occurred in the lens arrangement shown in FIG. 4. FIGS. 6A through 6C show transverse aberration of the lens arrangement shown in FIG. 4.

Table 1 shows the lens surface data, Table 2 shows the aspherical surface data, Table 3 shows various zoom lens system data, and Table 4 shows the zoom lens group data of the first embodiment.

The high zoom-ratio zoom lens system of the first embodiment includes a positive first lens group G1, a negative second lens group G2, a positive third lens group G3 and a positive fourth lens group G4, in this order from the object.

The third lens group G3 includes a positive first sub-lens group G3a and a negative second sub-lens group G3b, in this order from the object.

The positive first sub-lens group G3a and the negative second sub-lens group G3b integrally move in the optical axis direction, so that the high zoom-ratio zoom lens system functions as a four-lens-group zoom lens system, i.e., a positive lens group, a negative lens group, a positive lens group and a positive lens group, in this order from the object.

The schematic lens-group moving paths of the high zoom-ratio zoom lens system are shown in FIG. 37. More specifically, the positive first lens group G1 (surface Nos. 1 through 6) includes a negative meniscus lens element having the convex surface facing toward the object, a biconvex positive lens element, and a positive meniscus lens element having the convex surface facing toward the object, in this order from the object.

The negative second lens group G2 (surface Nos. 7 through 16) includes a negative meniscus lens element having the convex surface facing toward the object, a biconcave negative lens element, a cemented lens composed of a biconvex positive lens element and a negative lens element having a concave surface facing toward the object, and a negative lens element having a concave surface facing toward the object, in this order from the object.

The positive first sub-lens group G3a (surface Nos. 18 through 24) of the positive third lens group G3 includes two biconvex positive lens elements, and a cemented lens composed of a positive lens element and a negative lens element, in this order from the object.

The negative second sub-lens group G3b (surface Nos. 25 through 27) of the positive third lens group G3 includes a cemented lens composed of a biconcave negative lens element and a positive meniscus lens element, in this order from the object.

The positive fourth lens group G4 (surface Nos. 28 through 31) includes a biconvex positive lens element and a biconcave negative lens element, in this order from the object.

In the positive first sub-lens group G3a, the second positive lens element from the object has the strongest positive refractive power out of the positive lens elements provided on the object-side of the cemented lens which is positioned at the most image-side of the positive first sub-lens group G3a.

TABLE 1

SURFACE DATA

| Surf. No. | R | d | Nd | νd |
|---|---|---|---|---|
| 1 | 188.763 | 2.200 | 1.83400 | 37.2 |
| 2 | 87.460 | 1.200 | | |
| 3 | 84.236 | 10.485 | 1.43875 | 95.0 |
| 4 | −220.825 | 0.200 | | |
| 5 | 83.550 | 6.238 | 1.61800 | 63.4 |
| 6 | 191.816 | D6 | | |
| 7* | 35.025 | 0.200 | 1.52972 | 42.7 |
| 8 | 34.518 | 1.600 | 1.80400 | 46.6 |
| 9 | 18.580 | 8.629 | | |
| 10 | −51.569 | 1.500 | 1.83481 | 42.7 |
| 11 | 71.225 | 0.200 | | |
| 12 | 35.801 | 4.577 | 1.84666 | 23.8 |
| 13 | −46.880 | 1.300 | 1.80400 | 46.6 |
| 14 | −139.173 | 1.441 | | |
| 15 | −32.999 | 1.300 | 1.80400 | 46.6 |
| 16 | 380.599 | D16 | | |
| 17 (Diaphragm) | ∞ | 1.400 | | |
| 18 | 50.225 | 2.851 | 1.50039 | 63.1 |
| 19 | −231.825 | 0.200 | | |
| 20 | 31.337 | 3.996 | 1.45600 | 90.3 |
| 21 | −134.294 | 0.446 | | |
| 22 | 42.878 | 3.466 | 1.49700 | 81.6 |
| 23 | −104.289 | 1.200 | 1.80999 | 30.5 |
| 24 | 77.143 | 3.500 | | |
| 25 | −52.888 | 1.300 | 1.73960 | 52.1 |
| 26 | 96.712 | 2.000 | 1.79535 | 29.9 |
| 27 | 296.674 | D27 | | |
| 28* | 130.311 | 4.500 | 1.61800 | 63.4 |
| 29 | −28.580 | 0.648 | | |
| 30 | −102.041 | 1.200 | 1.62665 | 45.1 |
| 31 | 113.581 | — | | |

The symbol * designates the aspherical surface which is rotationally symmetrical with respect to the optical axis.

TABLE 2

ASPHERICAL SURFACE DATA
The aspherical surface coefficients not indicated are zero (0.00)):

| Surf. No. | K | A4 | A6 | A8 | A10 |
|---|---|---|---|---|---|
| 7 | 0.000 | $0.2162 \times 10^{-5}$ | $-0.1712 \times 10^{-8}$ | $-0.7889 \times 10^{-11}$ | $0.6794 \times 10^{-13}$ |
| 28 | 0.000 | $-0.1949 \times 10^{-4}$ | $-0.4618 \times 10^{-9}$ | | |

TABLE 3

ZOOM LENS SYSTEM DATA
Zoom Ratio 13.22

| | Short Focal Length Extremity |
|---|---|
| FNO. | 3.3 |
| f | 25.71 |
| W | 30.0 |
| Y | 14.24 |
| fB | 52.92 |
| L | 174.86 |
| D6 | 3.700 |
| D16 | 41.924 |
| D27 | 8.536 |

TABLE 3-continued

ZOOM LENS SYSTEM DATA
Zoom Ratio 13.22

| | Intermediate Focal Length |
|---|---|
| FNO. | 4.8 |
| f | 99.99 |
| W | 7.9 |
| Y | 14.24 |
| fB | 89.32 |
| L | 240.57 |
| D6 | 61.017 |
| D16 | 18.385 |
| D27 | 4.081 |

| | Long Focal Length Extremity |
|---|---|
| FNO. | 5.7 |
| f | 339.99 |
| W | 2.4 |
| Y | 14.24 |
| fB | 108.59 |
| L | 281.04 |
| D6 | 98.774 |
| D16 | 2.800 |
| D27 | 3.100 |

TABLE 4

ZOOM LENS GROUP DATA

| Lens Group | First Surface | Focal Length |
|---|---|---|
| 1 | 1 | 155.71 |
| 2 | 7 | −20.37 |
| 3a(3) | 18 | 34.25 |
| 3b(3) | 25 | −61.92 |
| 4(4) | 28 | 67.32 |

Embodiment 2

Figure 7:
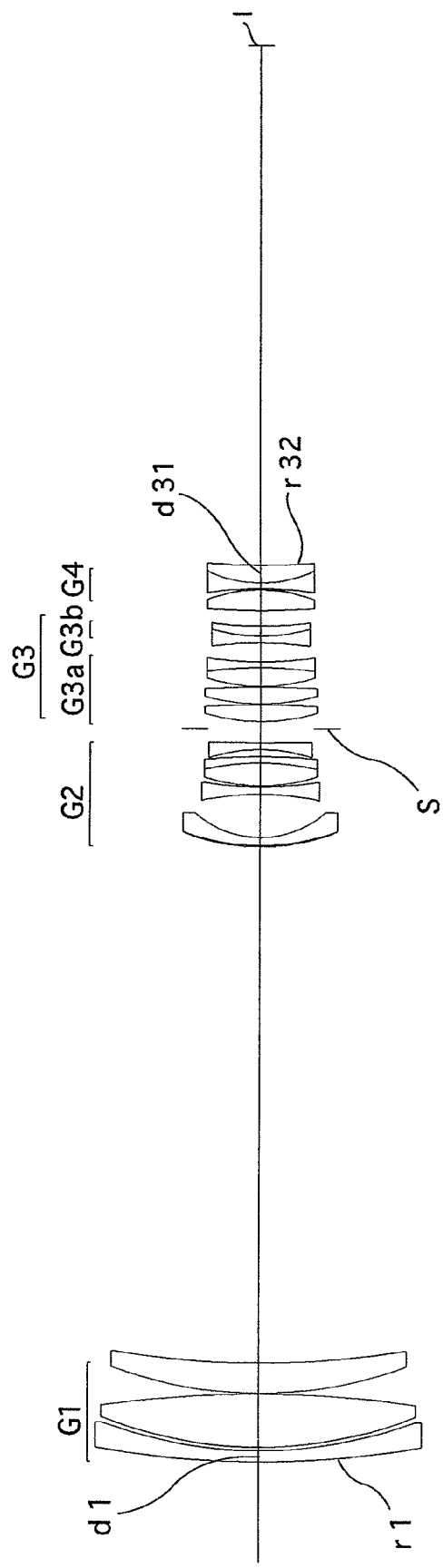
FIG. 7 shows a lens arrangement of the high zoom-ratio zoom lens system, according to a second embodiment of the present invention, at the long focal length extremity when an object at infinity is in an in-focus state.

FIG. 7 shows the lens arrangement of the high zoom-ratio zoom lens system, according to a second embodiment of the present invention, at the long focal length extremity when an object at infinity is in an in-focus state. FIGS. 8A through 8D show aberrations occurred in the lens arrangement shown in FIG. 7. FIGS. 9A through 9C show transverse aberration occurred in the lens arrangement shown in FIG. 7.

Figure 10:
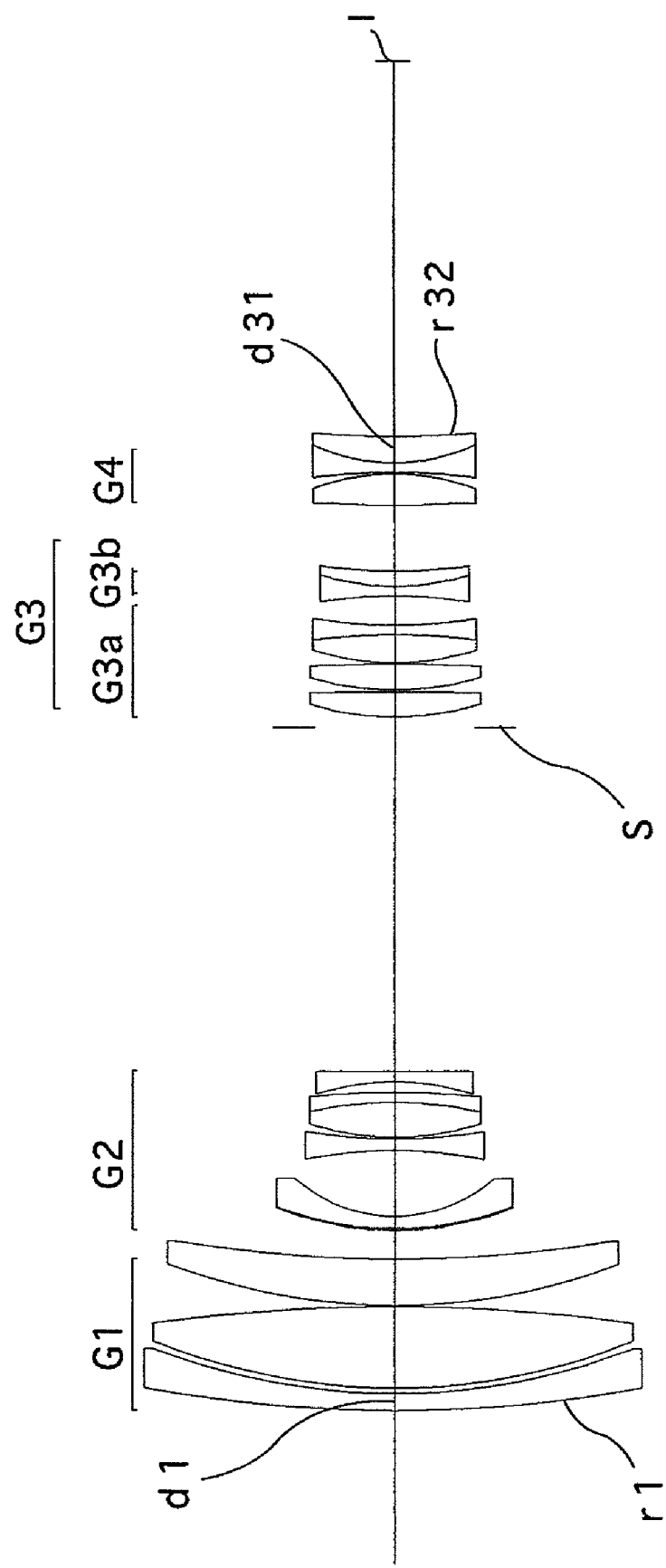
FIG. 10 shows a lens arrangement of the high zoom-ratio zoom lens system, according to the second embodiment of the present invention, at the short focal length extremity when an object at infinity is in an in-focus state.

FIG. 10 shows the lens arrangement of the high zoom-ratio zoom lens system, according to the second embodiment of the present invention, at the short focal length extremity when an object at infinity is in an in-focus state. FIGS. 11A through 11D show aberrations occurred in the lens arrangement shown in FIG. 10. FIGS. 12A through 12C show transverse aberration of the lens arrangement shown in FIG. 10.

Table 5 shows the lens surface data, Table 6 shows the aspherical surface data, Table 7 shows various zoom lens system data, and Table 8 shows the zoom lens group data of the second embodiment.

The lens arrangement of the high zoom-ratio zoom lens system of the second embodiment is the same as that of the first embodiment except that the positive first sub-lens group G3a and the negative second sub-lens group G3b are arranged to maintain substantially the same distance therebetween at the short long focal length extremity and the long focal length extremity, and to separately move in the optical axis direction while the distance therebetween increases over intermediate focal length positions upon zooming, so that the high zoom-ratio zoom lens system functions as a five-lens-group zoom lens system, i.e., a positive lens group, a negative lens group, a positive lens group, a negative lens group and a positive lens group, in this order from the object.

The positive fourth lens group G4 (surface Nos. 28 through 32) includes a positive lens element and a cemented lens composed of a negative lens element and a positive lens element, in this order from the object.

The schematic lens-group moving paths of the high zoom-ratio zoom lens system are shown in FIG. 38.

The most object-side positive lens element in the positive first sub-lens group G3a has the strongest positive refractive power out of the positive lens elements provided on the object-side of the cemented lens which is positioned at the most image-side of the positive first sub-lens group G3a.

TABLE 5

SURFACE DATA

| Surf. No. | R | d | Nd | vd |
|---|---|---|---|---|
| 1 | 185.716 | 2.200 | 1.83400 | 37.2 |
| 2 | 88.615 | 0.723 | | |
| 3 | 84.964 | 10.485 | 1.43875 | 95.0 |
| 4 | −229.812 | 0.200 | | |
| 5 | 84.699 | 6.030 | 1.61800 | 63.4 |
| 6 | 182.940 | D6 | | |
| 7* | 44.498 | 0.200 | 1.52972 | 42.7 |
| 8 | 44.320 | 1.600 | 1.80400 | 46.6 |
| 9 | 20.045 | 8.540 | | |
| 10 | −59.155 | 1.500 | 1.83481 | 42.7 |
| 11 | 72.007 | 0.200 | | |
| 12 | 37.093 | 4.530 | 1.84666 | 23.8 |
| 13 | −50.628 | 1.300 | 1.80400 | 46.6 |
| 14 | −106.575 | 1.376 | | |
| 15 | −33.269 | 1.300 | 1.80400 | 46.6 |
| 16 | 671.583 | D16 | | |
| 17 (Diaphragm) | ∞ | 1.400 | | |
| 18 | 39.005 | 3.278 | 1.59225 | 60.7 |
| 19 | −285.568 | 0.200 | | |
| 20 | 40.213 | 3.346 | 1.43875 | 95.0 |
| 21 | −251.604 | 0.200 | | |
| 22 | 36.707 | 3.661 | 1.48749 | 70.2 |
| 23 | −86.323 | 1.200 | 1.80518 | 25.4 |
| 24 | 69.071 | D24 | | |
| 25 | −74.837 | 1.300 | 1.69680 | 55.5 |
| 26 | 33.988 | 2.000 | 1.80518 | 25.4 |
| 27 | 72.043 | D27 | | |

TABLE 5-continued

SURFACE DATA

| Surf. No. | R | d | Nd | vd |
|---|---|---|---|---|
| 28* | 95.154 | 4.135 | 1.61800 | 63.4 |
| 29 | −30.517 | 0.200 | | |
| 30 | −78.168 | 1.200 | 1.53172 | 48.9 |
| 31 | 25.643 | 3.500 | 1.48749 | 70.2 |
| 32 | 143.882 | — | | |

The symbol * designates the aspherical surface which is rotationally symmetrical with respect to the optical axis.

TABLE 6

ASPHERICAL SURFACE DATA
The aspherical surface coefficients not indicated are zero (0.00)):

| Surf. No. | K | A4 | A6 | A8 | A10 |
|---|---|---|---|---|---|
| 7 | 0.000 | $0.1634 \times 10^{-5}$ | $-0.1884 \times 10^{-8}$ | $-0.6365 \times 10^{-11}$ | $0.4933 \times 10^{-13}$ |
| 28 | 0.000 | $-0.1793 \times 10^{-4}$ | $-0.1956 \times 10^{-8}$ | | |

TABLE 7

ZOOM LENS SYSTEM DATA
Zoom Ratio 13.22

| | Short Focal Length Extremity |
|---|---|
| FNO. | 3.3 |
| f | 25.71 |
| W | 30.0 |
| Y | 14.24 |
| fB | 48.60 |
| L | 174.99 |
| D6 | 3.700 |
| D16 | 44.604 |
| D24 | 3.741 |
| D27 | 8.540 |

| | Intermediate Focal Length |
|---|---|
| FNO. | 4.8 |
| f | 100.00 |
| W | 7.9 |
| Y | 14.24 |
| fB | 83.95 |
| L | 239.72 |
| D6 | 62.655 |
| D16 | 19.352 |
| D24 | 3.889 |
| D27 | 4.071 |

| | Long Focal Length Extremity |
|---|---|
| FNO. | 5.7 |
| f | 339.99 |
| W | 2.4 |
| Y | 14.24 |
| fB | 103.52 |
| L | 281.04 |
| D6 | 102.074 |
| D16 | 2.800 |
| D24 | 3.741 |
| D27 | 3.100 |

TABLE 8

ZOOM LENS GROUP DATA

| Lens Group | First Surface | Focal Length |
|---|---|---|
| 1 | 1 | 161.13 |
| 2 | 7 | −21.57 |
| 3a(3) | 18 | 34.12 |
| 3b(4) | 25 | −57.37 |
| 4(5) | 28 | 66.76 |

Embodiment 3

Figure 13:
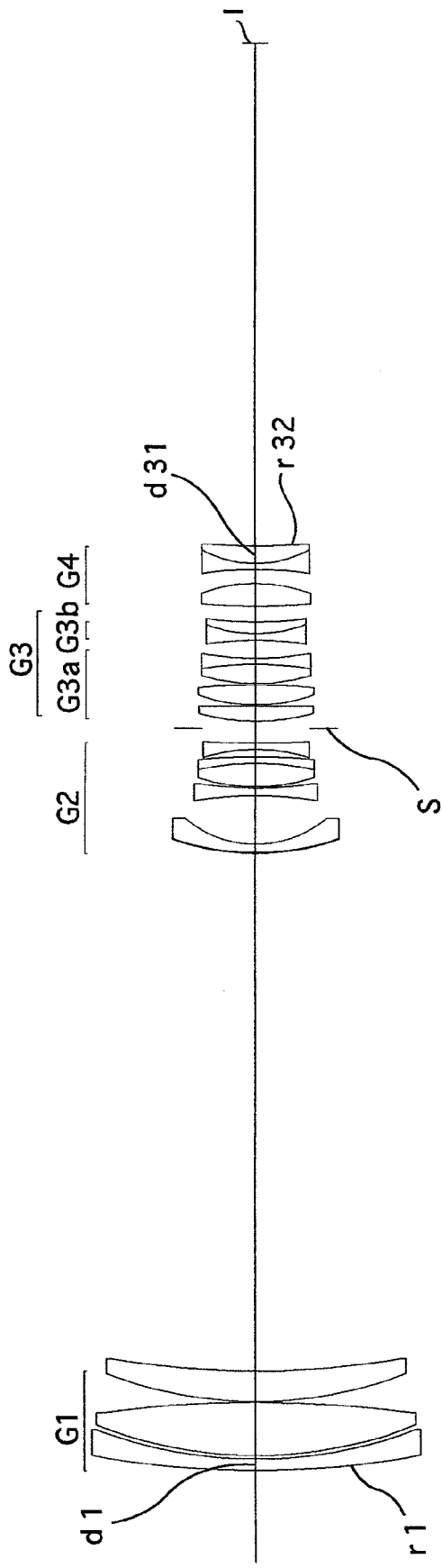
FIG. 13 shows a lens arrangement of the high zoom-ratio zoom lens system, according to a third embodiment of the present invention, at the long focal length extremity when an object at infinity is in an in-focus state.

FIG. 13 shows the lens arrangement of the high zoom-ratio zoom lens system, according to a third embodiment of the present invention, at the long focal length extremity when an object at infinity is in an in-focus state. FIGS. 14A through 14D show aberrations occurred in the lens arrangement shown in FIG. 13. FIGS. 15A through 15C show transverse aberration occurred in the lens arrangement shown in FIG. 13.

Figure 16:
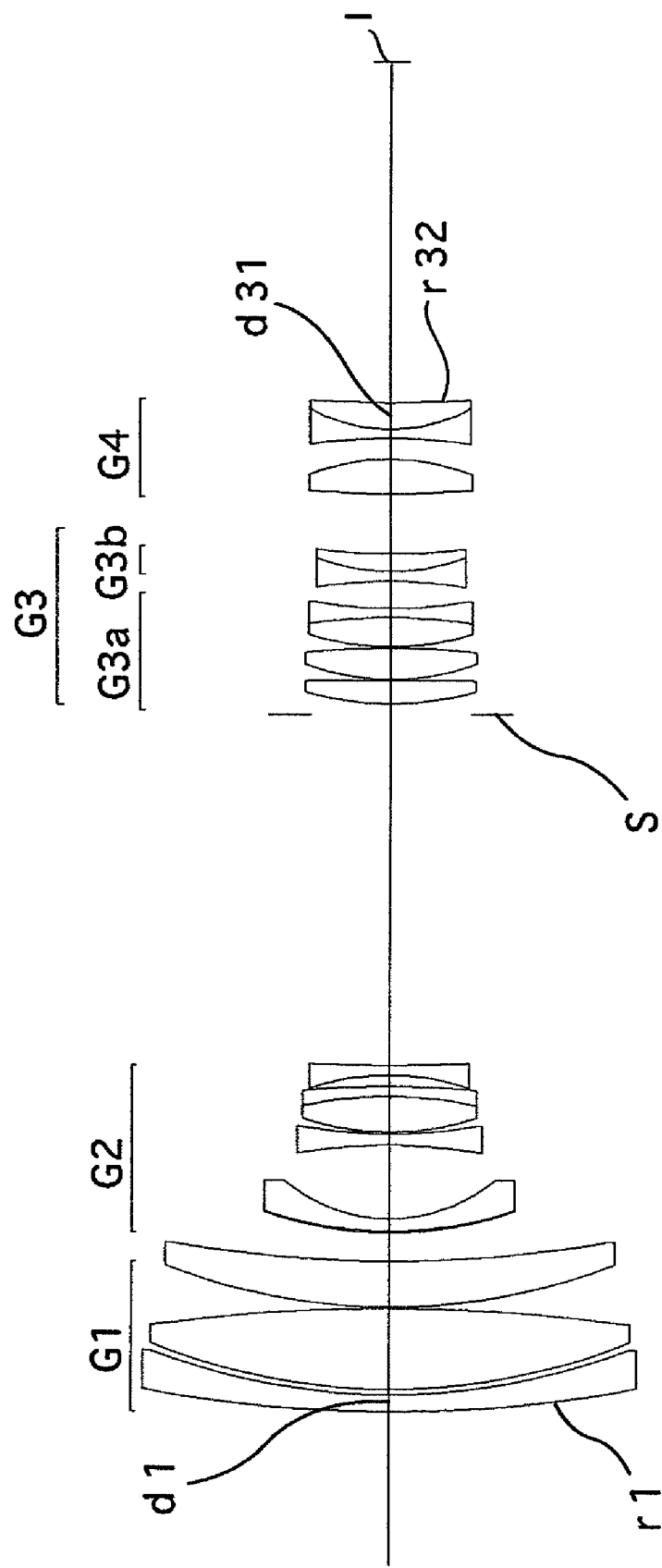
FIG. 16 shows a lens arrangement of the high zoom-ratio zoom lens system, according to the third embodiment of the present invention, at the short focal length extremity when an object at infinity is in an in-focus state.

FIG. 16 shows the lens arrangement of the high zoom-ratio zoom lens system, according to the third embodiment of the present invention, at the short focal length extremity when an object at infinity is in an in-focus state. FIGS. 17A through 17D show aberrations occurred in the lens arrangement shown in FIG. 16. FIGS. 18A through 18C show transverse aberration of the lens arrangement shown in FIG. 16.

Table 9 shows the lens surface data, Table 10 shows the aspherical surface data, Table 11 shows various zoom lens system data, and Table 12 shows the zoom lens group data of the third embodiment.

The basic lens arrangement and manner of movement of the lens groups upon zooming in the high zoom-ratio zoom lens system of the third embodiment is the same as those of the second embodiment.

The schematic lens-group moving paths of the high zoom-ratio zoom lens system are shown in FIG. 38.

In the positive first sub-lens group G3a, the second positive lens element from the object has the strongest positive refractive power out of the positive lens elements provided on the object-side of the cemented lens which is positioned at the most image-side of the positive first sub-lens group G3a.

TABLE 9

SURFACE DATA

| Surf. No. | R | d | Nd | νd |
|---|---|---|---|---|
| 1 | 181.537 | 2.200 | 1.83400 | 37.2 |
| 2 | 87.978 | 0.696 | | |
| 3 | 84.413 | 10.485 | 1.43875 | 95.0 |
| 4 | −227.522 | 0.200 | | |
| 5 | 82.933 | 5.949 | 1.61800 | 63.4 |
| 6 | 168.558 | D6 | | |

TABLE 9-continued

SURFACE DATA

| Surf. No. | R | d | Nd | νd |
|---|---|---|---|---|
| 7* | 52.412 | 0.200 | 1.52972 | 42.7 |
| 8 | 51.969 | 1.600 | 1.80400 | 46.6 |
| 9 | 21.837 | 9.515 | | |
| 10 | −73.456 | 1.500 | 1.83481 | 42.7 |
| 11 | 71.743 | 0.200 | | |
| 12 | 36.855 | 4.637 | 1.84666 | 23.8 |
| 13 | −53.478 | 1.300 | 1.80400 | 46.6 |
| 14 | −122.561 | 1.459 | | |
| 15 | −33.992 | 1.300 | 1.80400 | 46.6 |
| 16 | 284.595 | D16 | | |
| 17 (Diaphragm) | ∞ | 1.400 | | |
| 18 | 42.433 | 3.001 | 1.58913 | 61.2 |
| 19 | −1124.864 | 0.200 | | |
| 20 | 34.168 | 4.011 | 1.43875 | 95.0 |
| 21 | −115.959 | 0.200 | | |
| 22 | 37.547 | 3.817 | 1.48749 | 70.2 |
| 23 | −69.621 | 1.200 | 1.80518 | 25.4 |
| 24 | 61.408 | D24 | | |
| 25 | −65.080 | 1.300 | 1.69680 | 55.5 |
| 26 | 28.620 | 2.279 | 1.80518 | 25.4 |
| 27 | 78.123 | D27 | | |
| 28* | 86.590 | 4.500 | 1.61800 | 63.4 |
| 29 | −30.869 | 2.738 | | |
| 30 | −75.928 | 1.200 | 1.53172 | 48.9 |
| 31 | 22.038 | 3.500 | 1.48749 | 70.2 |
| 32 | 152.992 | — | | |

The symbol * designates the aspherical surface which is rotationally symmetrical with respect to the optical axis.

TABLE 10

ASPHERICAL SURFACE DATA
The aspherical surface coefficients not indicated are zero (0.00)):

| Surf. No. | K | A4 | A6 | A8 | A10 |
|---|---|---|---|---|---|
| 7 | 0.000 | $0.1424 \times 10^{-5}$ | $-0.1956 \times 10^{-8}$ | $0.3015 \times 10^{-13}$ | $0.2476 \times 10^{-13}$ |
| 28 | 0.000 | $-0.1792 \times 10^{-4}$ | $-0.3055 \times 10^{-9}$ | | |

TABLE 7

ZOOM LENS SYSTEM DATA
Zoom Ratio 13.22

| | Short Focal Length Extremity |
|---|---|
| FNO. | 3.3 |
| f | 25.71 |
| W | 30.0 |
| Y | 14.24 |
| fB | 44.85 |
| L | 176.04 |
| D6 | 3.700 |
| D16 | 45.556 |
| D24 | 3.527 |
| D27 | 7.822 |

| | Intermediate Focal Length |
|---|---|
| FNO. | 4.8 |
| f | 99.99 |
| W | 7.9 |
| Y | 14.24 |
| fB | 79.44 |
| L | 239.42 |
| D6 | 62.023 |

TABLE 7-continued

ZOOM LENS SYSTEM DATA
Zoom Ratio 13.22

| D16 | 19.752 |
| --- | --- |
| D24 | 3.653 |
| D27 | 3.960 |

| | Long Focal Length Extremity |
| --- | --- |
| FNO. | 5.7 |
| f | 339.94 |
| W | 2.4 |
| Y | 14.24 |
| fB | 99.66 |
| L | 281.02 |
| D6 | 101.349 |
| D16 | 2.800 |
| D24 | 3.527 |
| D27 | 3.100 |

TABLE 12

ZOOM LENS GROUP DATA

| Lens Group | First Surface | Focal Length |
| --- | --- | --- |
| 1 | 1 | 162.11 |
| 2 | 7 | −21.98 |
| 3a(3) | 18 | 35.33 |
| 3b(4) | 25 | −57.57 |
| 4(5) | 28 | 62.81 |

Embodiment 4

Figure 19:
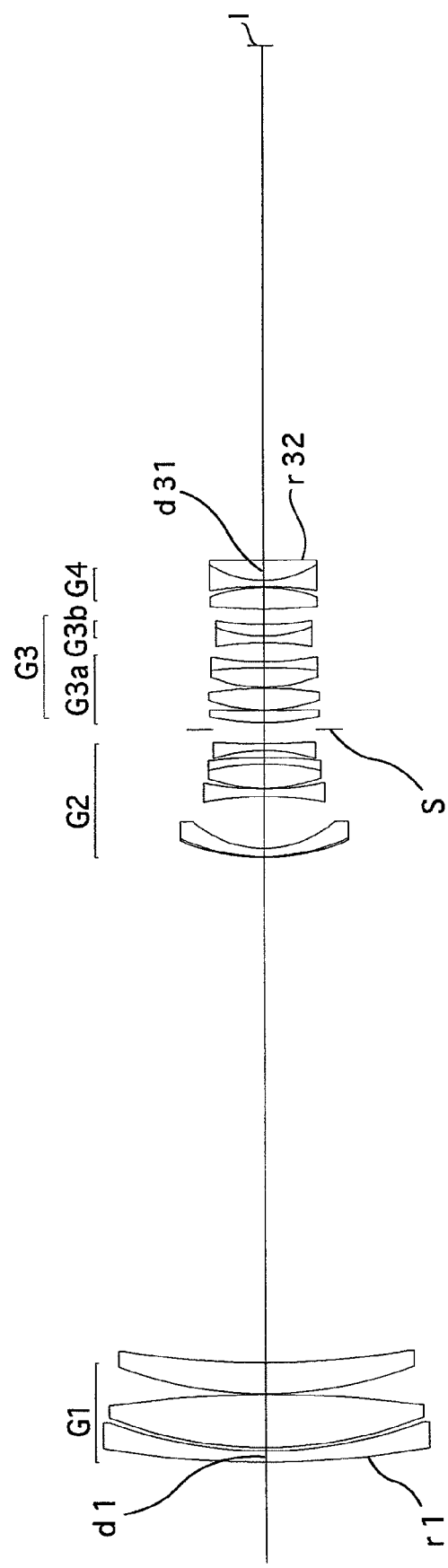
FIG. 19 shows a lens arrangement of the high zoom-ratio zoom lens system, according to a fourth embodiment of the present invention, at the long focal length extremity when an object at infinity is in an in-focus state.

FIG. 19 shows the lens arrangement of the high zoom-ratio zoom lens system, according to the fourth embodiment of the present invention, at the long focal length extremity when an object at infinity is in an in-focus state. FIGS. 20A through 20D show aberrations occurred in the lens arrangement shown in FIG. 19. FIGS. 21A through 21C show transverse aberration occurred in the lens arrangement shown in FIG. 19.

Figure 22:
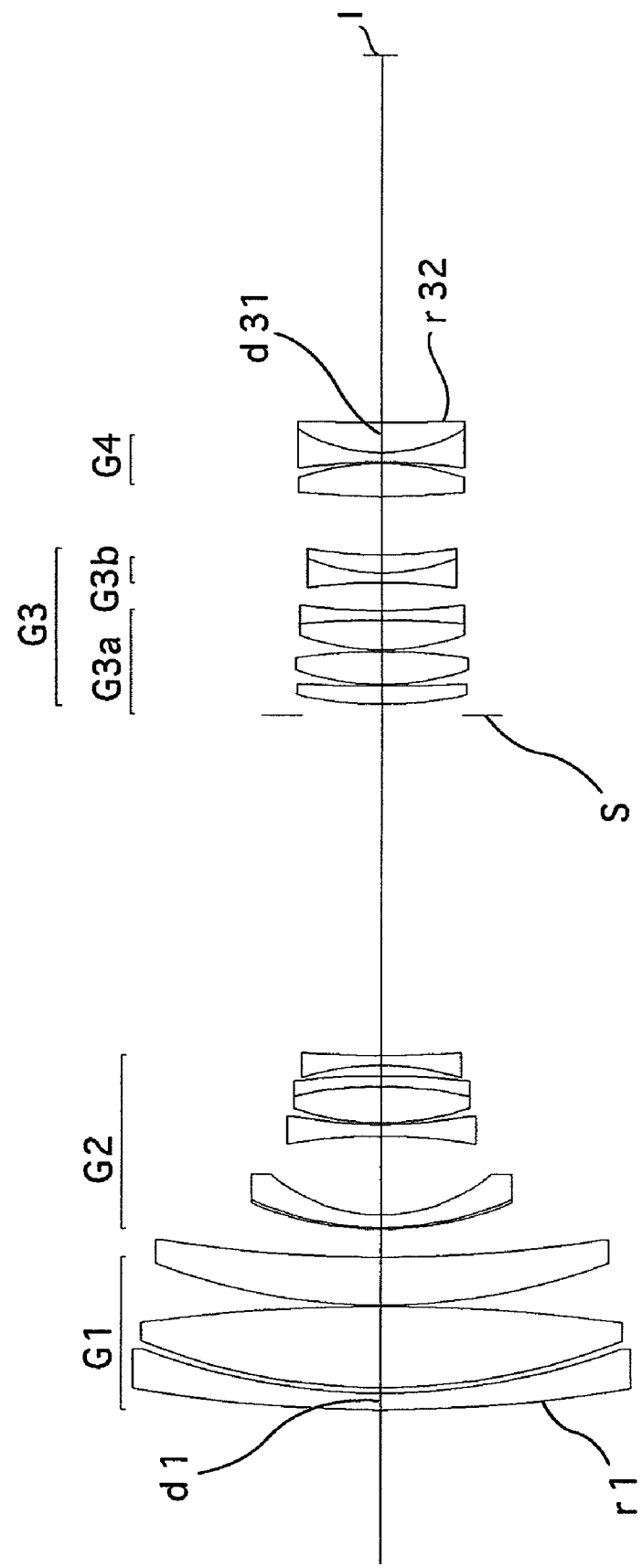
FIG. 22 shows a lens arrangement of the high zoom-ratio zoom lens system, according to the fourth embodiment of the present invention, at the short focal length extremity when an object at infinity is in an in-focus state.

FIG. 22 shows the lens arrangement of the high zoom-ratio zoom lens system, according to the fourth embodiment of the present invention, at the short focal length extremity when an object at infinity is in an in-focus state. FIGS. 23A through 23D show aberrations occurred in the lens arrangement shown in FIG. 22. FIGS. 24A through 24C show transverse aberration of the lens arrangement shown in FIG. 22.

Table 13 shows the lens surface data, Table 14 shows the aspherical surface data, Table 15 shows various zoom lens system data, and Table 16 shows the zoom lens group data of the fourth embodiment.

The basic lens arrangement and manner of movement of the lens groups upon zooming in the high zoom-ratio zoom lens system of the fourth embodiment is the same as those of the second embodiment.

The schematic lens-group moving paths of the high zoom-ratio zoom lens system are shown in FIG. 38.

In the positive first sub-lens group G3a, the second positive lens element from the object has the strongest positive refractive power out of the positive lens elements provided on the object-side of the cemented lens which is positioned at the most image-side of the positive first sub-lens group G3a.

TABLE 13

SURFACE DATA

| Surf. No. | R | d | Nd | νd |
| --- | --- | --- | --- | --- |
| 1 | 192.727 | 2.200 | 1.83400 | 37.2 |
| 2 | 89.089 | 0.682 | | |
| 3 | 85.205 | 10.485 | 1.43875 | 95.0 |
| 4 | −228.854 | 0.200 | | |
| 5 | 84.097 | 6.157 | 1.61800 | 63.4 |
| 6 | 189.369 | D6 | | |
| 7* | 46.555 | 0.200 | 1.52972 | 42.7 |
| 8 | 41.963 | 1.600 | 1.80400 | 46.6 |
| 9 | 21.969 | 10.206 | | |
| 10 | −67.736 | 1.500 | 1.83481 | 42.7 |
| 11 | 61.888 | 0.200 | | |
| 12 | 34.907 | 4.734 | 1.84666 | 23.8 |
| 13 | −50.699 | 1.300 | 1.80400 | 46.6 |
| 14 | −108.121 | 1.421 | | |
| 15 | −32.584 | 1.300 | 1.80400 | 46.6 |
| 16 | 160.353 | D16 | | |
| 17 (Diaphragm) | ∞ | 1.400 | | |
| 18 | 52.226 | 2.348 | 1.61157 | 60.5 |
| 19 | 279.864 | 0.200 | | |
| 20 | 33.881 | 4.278 | 1.43875 | 95.0 |
| 21 | −71.350 | 0.200 | | |
| 22 | 30.297 | 3.891 | 1.48749 | 70.2 |
| 23 | −103.176 | 1.200 | 1.81000 | 25.0 |
| 24 | 68.388 | D24 | | |
| 25 | −66.787 | 1.300 | 1.68826 | 57.0 |
| 26 | 27.337 | 2.279 | 1.80518 | 25.4 |
| 27 | 55.673 | D27 | | |
| 28* | 79.386 | 4.300 | 1.61800 | 63.4 |
| 29 | −31.974 | 0.200 | | |
| 30 | −67.599 | 1.200 | 1.53172 | 48.9 |
| 31 | 20.272 | 4.000 | 1.48749 | 70.2 |
| 32 | 674.884 | — | | |

The symbol * designates the aspherical surface which is rotationally symmetrical with respect to the optical axis.

TABLE 14

ASPHERICAL SURFACE DATA
The aspherical surface coefficients not indicated are zero (0.00)):

| Surf. No. | K | A4 | A6 | A8 | A10 |
| --- | --- | --- | --- | --- | --- |
| 7 | 0.000 | $0.1695 \times 10^{-5}$ | $-0.5608 \times 10^{-10}$ | $-0.6148 \times 10^{-11}$ | $0.4256 \times 10^{-13}$ |
| 28 | 0.000 | $-0.1709 \times 10^{-4}$ | $-0.1118 \times 10^{-8}$ | | |

TABLE 15

ZOOM LENS SYSTEM DATA
Zoom Ratio 13.22

| | Short Focal Length Extremity |
| --- | --- |
| FNO. | 3.3 |
| f | 25.71 |
| W | 30.0 |
| Y | 14.24 |
| fB | 47.87 |
| L | 176.02 |
| D6 | 3.700 |

TABLE 15-continued

ZOOM LENS SYSTEM DATA
Zoom Ratio 13.22

| | |
|---|---|
| D16 | 44.134 |
| D24 | 3.705 |
| D27 | 7.624 |

| Intermediate Focal Length | |
|---|---|
| FNO. | 4.8 |
| f | 100.00 |
| W | 7.9 |
| Y | 14.24 |
| fB | 83.42 |
| L | 239.97 |
| D6 | 60.614 |
| D16 | 19.055 |
| D24 | 3.838 |
| D27 | 4.067 |

| Long Focal Length Extremity | |
|---|---|
| FNO. | 5.7 |
| f | 339.96 |
| W | 2.4 |
| Y | 14.24 |
| fB | 102.82 |
| L | 281.01 |
| D6 | 99.602 |
| D16 | 2.800 |
| D24 | 3.704 |
| D27 | 3.100 |

TABLE 16

ZOOM LENS GROUP DATA

| Lens Group | First Surface | Focal Length |
|---|---|---|
| 1 | 1 | 159.89 |
| 2 | 7 | −21.28 |
| 3a(3) | 18 | 32.37 |
| 3b(4) | 25 | −48.35 |
| 4(5) | 28 | 61.35 |

Embodiment 5

Figure 25:
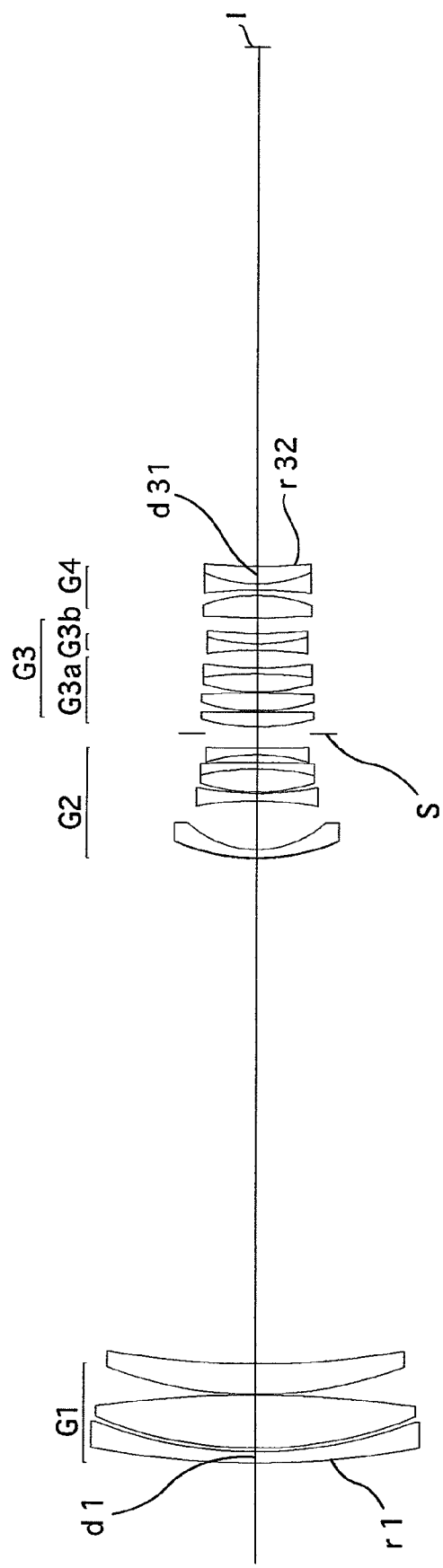
FIG. 25 shows a lens arrangement of the high zoom-ratio zoom lens system, according to a fifth embodiment of the present invention, at the long focal length extremity when an object at infinity is in an in-focus state.

FIG. 25 shows the lens arrangement of the high zoom-ratio zoom lens system, according to the fifth embodiment of the present invention, at the long focal length extremity when an object at infinity is in an in-focus state. FIGS. 26A through 26D show aberrations occurred in the lens arrangement shown in FIG. 25. FIGS. 27A through 27C show transverse aberration occurred in the lens arrangement shown in FIG. 25.

Figure 28:
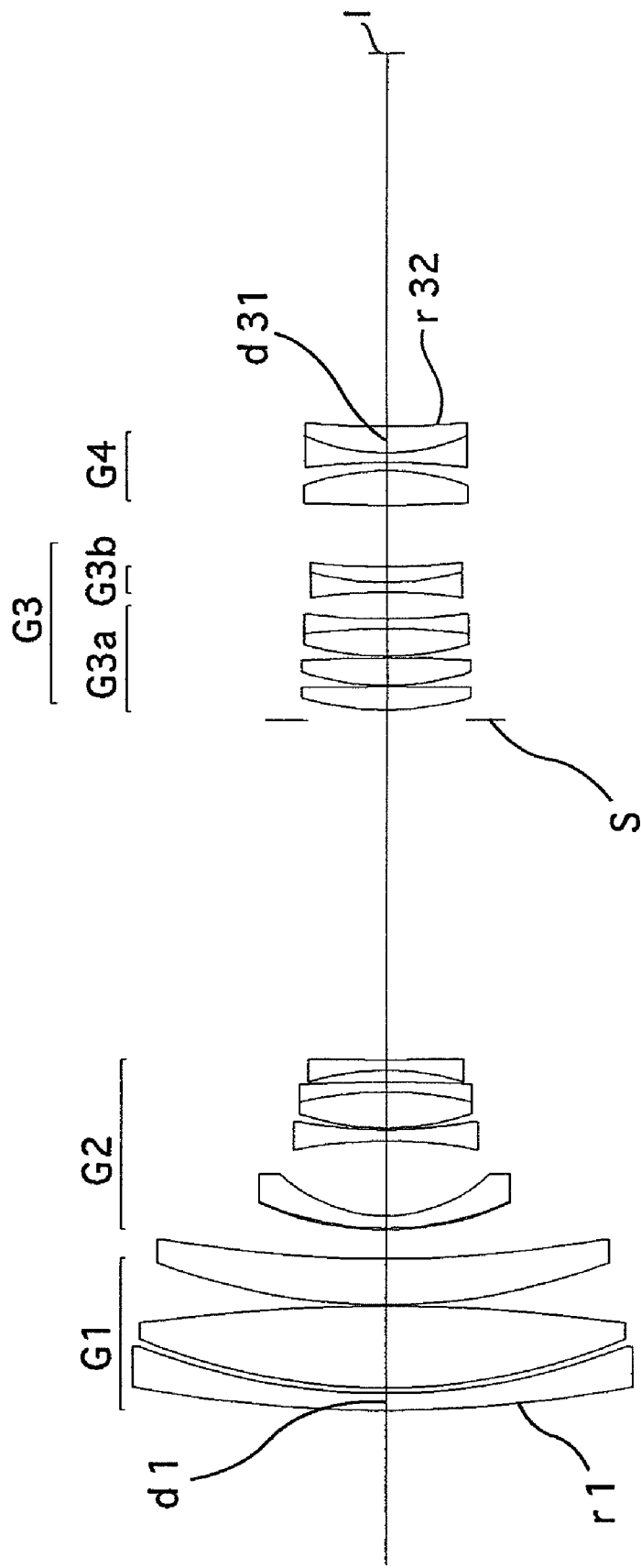
FIG. 28 shows a lens arrangement of the high zoom-ratio zoom lens system, according to the fifth embodiment of the present invention, at the short focal length extremity when an object at infinity is in an in-focus state.

FIG. 28 shows the lens arrangement of the high zoom-ratio zoom lens system, according to the fifth embodiment of the present invention, at the short focal length extremity when an object at infinity is in an in-focus state. FIGS. 29A through 29D show aberrations occurred in the lens arrangement shown in FIG. 28. FIGS. 30A through 30C show transverse aberration of the lens arrangement shown in FIG. 28.

Table 17 shows the lens surface data, Table 18 shows the aspherical surface data, Table 19 shows various zoom lens system data, and Table 20 shows the zoom lens group data of the fifth embodiment.

The basic lens arrangement of the fifth embodiment is the same as that of the first embodiment except that the negative second lens group G2 monotonically moves toward the object upon zooming from the short focal length extremity to the long focal length extremity.

The schematic lens-group moving paths of the high zoom-ratio zoom lens system are shown in FIG. 39.

In the first sub-lens group G3a, the first positive lens element from the object has the strongest positive refractive power out of the positive lens elements provided on the object-side of the cemented lens which is positioned at the most image-side of the positive first sub-lens group G3a.

TABLE 17

SURFACE DATA

| Surf. No. | R | d | Nd | νd |
|---|---|---|---|---|
| 1 | 177.637 | 2.200 | 1.83400 | 37.3 |
| 2 | 86.809 | 0.717 | | |
| 3 | 83.237 | 10.485 | 1.43875 | 95.0 |
| 4 | −227.479 | 0.200 | | |
| 5 | 83.483 | 5.985 | 1.61800 | 63.4 |
| 6 | 173.986 | D6 | | |
| 7* | 41.651 | 0.200 | 1.52972 | 42.7 |
| 8 | 42.009 | 1.600 | 1.80420 | 46.5 |
| 9 | 20.484 | 9.635 | | |
| 10 | −66.555 | 1.500 | 1.83481 | 42.7 |
| 11 | 65.484 | 0.200 | | |
| 12 | 36.094 | 4.615 | 1.84666 | 23.8 |
| 13 | −50.341 | 1.300 | 1.80420 | 46.5 |
| 14 | −215.882 | 1.526 | | |
| 15 | −35.200 | 1.300 | 1.80420 | 46.5 |
| 16 | 402.120 | D16 | | |
| 17 (Diaphragm) | ∞ | 1.400 | | |
| 18 | 41.769 | 2.947 | 1.58913 | 61.2 |
| 19 | −1419.472 | 0.200 | | |
| 20 | 36.720 | 3.579 | 1.43875 | 95.0 |
| 21 | −184.579 | 0.200 | | |
| 22 | 38.514 | 3.570 | 1.48749 | 70.4 |
| 23 | −89.296 | 1.200 | 1.80518 | 25.5 |
| 24 | 72.969 | 3.510 | | |
| 25 | −72.865 | 1.300 | 1.69680 | 55.5 |
| 26 | 38.712 | 2.000 | 1.80518 | 25.5 |
| 27 | 89.555 | D27 | | |
| 28* | 96.499 | 4.500 | 1.61800 | 63.4 |
| 29 | −30.603 | 1.085 | | |
| 30 | −82.688 | 1.200 | 1.53172 | 48.8 |
| 31 | 26.535 | 3.500 | 1.48749 | 70.4 |
| 32 | 131.816 | — | | |

The symbol * designates the aspherical surface which is rotationally symmetrical with respect to the optical axis.

TABLE 18

ASPHERICAL SURFACE DATA

The aspherical surface coefficients not indicated are zero (0.00)):

| Surf. No. | K | A4 | A6 | A8 | A10 |
|---|---|---|---|---|---|
| 7 | 0.000 | $0.1038 \times 10^{-5}$ | $-0.2936 \times 10^{-8}$ | $-0.8094 \times 10^{-12}$ | $0.1957 \times 10^{-13}$ |
| 28 | 0.000 | $-0.1798 \times 10^{-4}$ | $-0.7518 \times 10^{-9}$ | | |

TABLE 19

ZOOM LENS SYSTEM DATA
Zoom Ratio 13.24

| | Short Focal Length Extremity |
|---|---|
| FNO. | 3.3 |
| f | 25.71 |
| W | 30.0 |
| Y | 14.24 |
| fB | 48.67 |
| L | 175.85 |
| D6 | 3.700 |
| D16 | 43.831 |
| D27 | 7.992 |

| | Intermediate Focal Length |
|---|---|
| FNO. | 4.8 |
| f | 100.02 |
| W | 7.9 |
| Y | 14.24 |
| fB | 84.56 |
| L | 240.04 |
| D6 | 60.857 |
| D16 | 19.002 |
| D27 | 3.960 |

| | Long Focal Length Extremity |
|---|---|
| FNO. | 5.7 |
| f | 340.39 |
| W | 2.4 |
| Y | 14.24 |
| fB | 103.99 |
| L | 281.21 |
| D6 | 99.670 |
| D16 | 2.800 |
| D27 | 3.100 |

TABLE 20

ZOOM LENS GROUP DATA

| Lens Group | First Surface | Focal Length |
|---|---|---|
| 1 | 1 | 159.31 |
| 2 | 7 | −21.13 |
| 3a(3) | 17 | 35.49 |
| 3b(3) | 25 | −63.03 |
| 4(4) | 28 | 65.64 |

Embodiment 6

Figure 31:
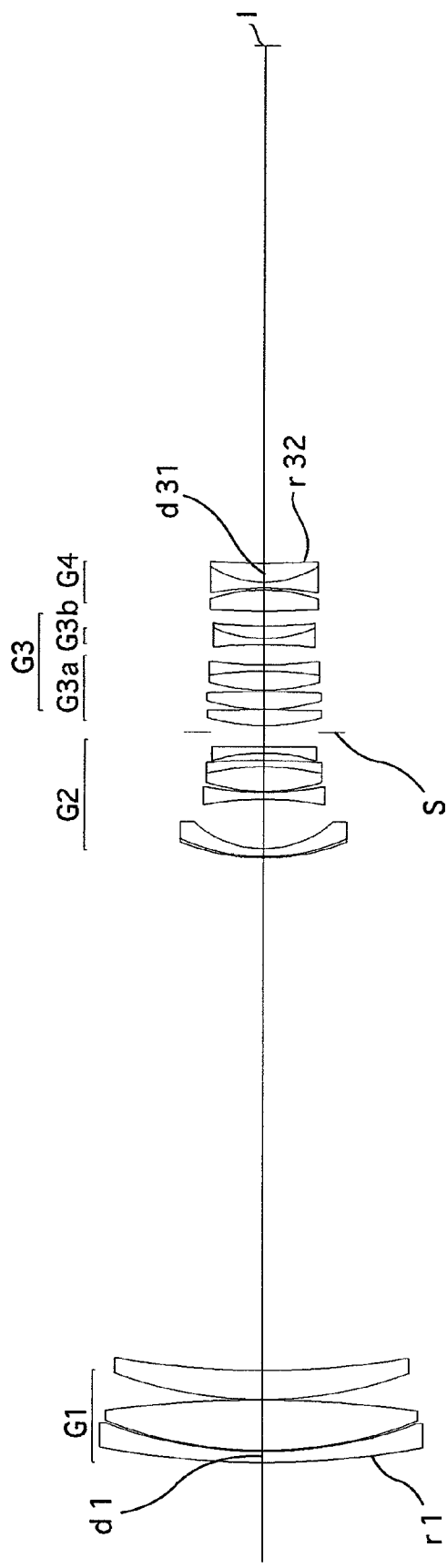
FIG. 31 shows a lens arrangement of the high zoom-ratio zoom lens system, according to a sixth embodiment of the present invention, at the long focal length extremity when an object at infinity is in an in-focus state.

FIG. 31 shows the lens arrangement of the high zoom-ratio zoom lens system, according to a sixth embodiment of the present invention, at the long focal length extremity when an object at infinity is in an in-focus state. FIGS. 32A through 32D show aberrations occurred in the lens arrangement shown in FIG. 31. FIGS. 33A through 33C show transverse aberration occurred in the lens arrangement shown in FIG. 31.

Figure 34:
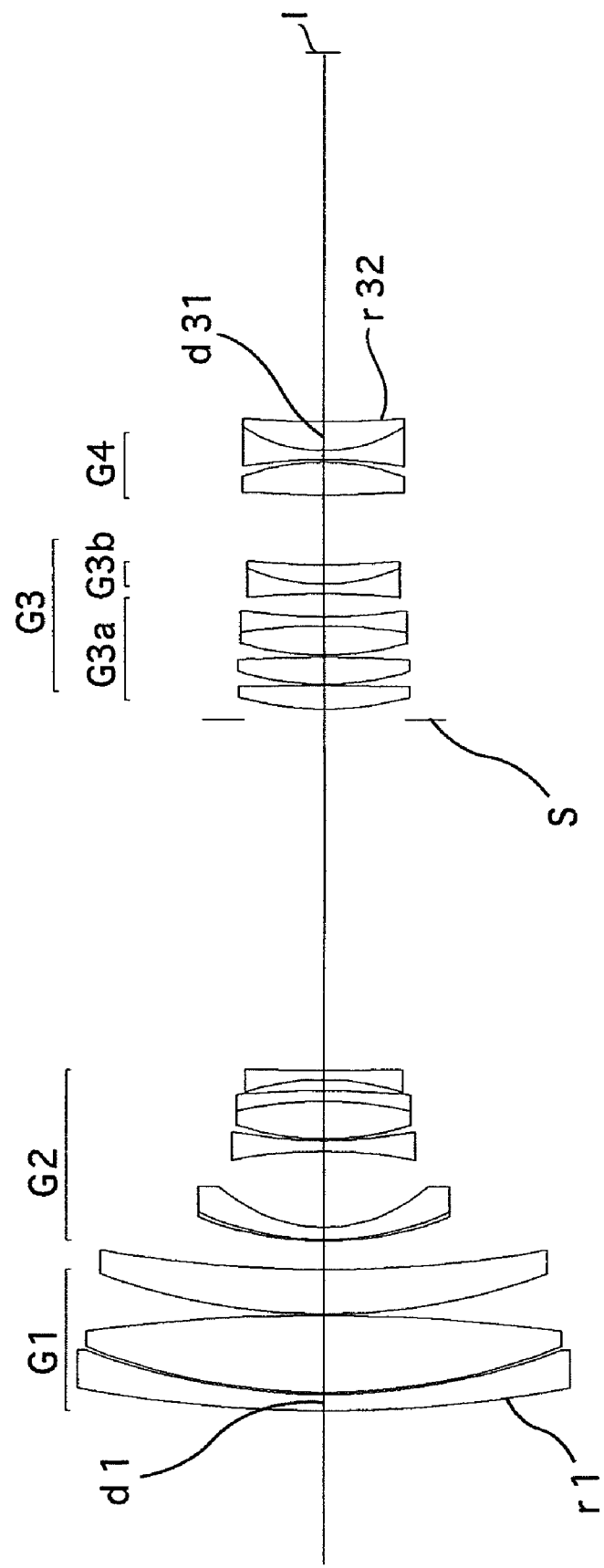
FIG. 34 shows a lens arrangement of the high zoom-ratio zoom lens system, according to the sixth embodiment of the present invention, at the short focal length extremity when an object at infinity is in an in-focus state.

FIG. 34 shows the lens arrangement of the high zoom-ratio zoom lens system, according to the sixth embodiment of the present invention, at the short focal length extremity when an object at infinity is in an in-focus state.

FIGS. 35A through 35D show aberrations occurred in the lens arrangement shown in FIG. 34. FIGS. 36A through 36C show transverse aberration of the lens arrangement shown in FIG. 34.

Table 21 shows the lens surface data, Table 22 shows the aspherical surface data, Table 23 shows various zoom lens system data, and Table 24 shows the zoom lens group data of the sixth embodiment.

The basic lens arrangement of the sixth embodiment is the same as that of the first embodiment except that the distance between the positive first sub-lens group G3a and the negative second sub-lens group G3b monotonically increases upon zooming from the short focal length extremity to the long focal length extremity.

The schematic lens-group moving paths of the high zoom-ratio zoom lens system are shown in FIG. 40.

In the first sub-lens group G3a, the most object-side positive lens element has the strongest positive refractive power out of the positive lens elements provided on the object-side of the cemented lens which is positioned at the most image-side of the positive first sub-lens group G3a.

TABLE 21

SURFACE DATA

| Surf. No. | R | d | Nd | νd |
|---|---|---|---|---|
| 1 | 177.928 | 2.200 | 1.83400 | 37.2 |
| 2 | 88.592 | 0.215 | | |
| 3 | 84.708 | 10.000 | 1.43875 | 95.0 |
| 4 | −239.762 | 0.200 | | |
| 5 | 85.122 | 5.800 | 1.61800 | 63.4 |
| 6 | 175.724 | D6 | | |
| 7* | 46.648 | 0.200 | 1.52972 | 42.7 |
| 8 | 40.340 | 1.600 | 1.80400 | 46.6 |
| 9 | 20.726 | 9.862 | | |
| 10 | −64.875 | 1.400 | 1.83481 | 42.7 |
| 11 | 63.281 | 0.200 | | |
| 12 | 37.357 | 4.917 | 1.84666 | 23.8 |
| 13 | −50.918 | 1.300 | 1.80400 | 46.6 |
| 14 | −147.099 | 1.452 | | |
| 15 | −35.195 | 1.300 | 1.80400 | 46.6 |
| 16 | 1504.060 | D16 | | |
| 17 (Diaphragm) | ∞ | 1.400 | | |
| 18 | 42.359 | 3.058 | 1.60311 | 60.7 |
| 19 | −619.351 | 0.200 | | |
| 20 | 39.149 | 3.550 | 1.43875 | 95.0 |
| 21 | −183.755 | 0.259 | | |
| 22 | 39.508 | 3.821 | 1.48749 | 70.2 |
| 23 | −69.462 | 1.200 | 1.80518 | 25.4 |
| 24 | 69.829 | D24 | | |
| 25 | −113.519 | 1.300 | 1.71300 | 53.9 |
| 26 | 25.589 | 2.500 | 1.80116 | 29.2 |
| 27 | 93.039 | D27 | | |
| 28* | 104.115 | 4.300 | 1.61800 | 63.4 |
| 29 | −31.564 | 0.330 | | |
| 30 | −63.062 | 1.200 | 1.52585 | 50.1 |
| 31 | 20.055 | 3.800 | 1.48749 | 70.2 |
| 32 | 150.483 | — | | |

The symbol * designates the aspherical surface which is rotationally symmetrical with respect to the optical axis.

TABLE 22

ASPHERICAL SURFACE DATA
The aspherical surface coefficients not indicated are zero (0.00)):

| Surf. No. | K | A4 | A6 | A8 | A10 |
|---|---|---|---|---|---|
| 7 | 0.000 | $0.1098 \times 10^{-5}$ | $-0.3742 \times 10^{-8}$ | $0.3399 \times 10^{-11}$ | $0.9662 \times 10^{-14}$ |
| 28 | 0.000 | $-0.1694 \times 10^{-4}$ | $-0.3658 \times 10^{-8}$ | | |

TABLE 23

ZOOM LENS SYSTEM DATA
Zoom Ratio 13.29

| | Short Focal Length Extremity |
|---|---|
| FNO. | 3.3 |
| f | 25.71 |
| W | 30.0 |
| Y | 14.24 |
| fB | 48.38 |
| L | 177.56 |
| D6 | 3.700 |
| D16 | 45.705 |
| D24 | 3.000 |
| D27 | 9.210 |

| | Intermediate Focal Length |
|---|---|
| FNO. | 4.0 |
| f | 50.00 |
| W | 15.5 |
| Y | 14.24 |
| fB | 65.31 |
| L | 205.44 |
| D6 | 32.913 |
| D16 | 29.774 |
| D24 | 3.669 |
| D27 | 6.218 |

| | Long Focal Length Extremity |
|---|---|
| FNO. | 5.7 |
| f | 341.56 |
| W | 2.4 |
| Y | 14.24 |
| fB | 104.47 |
| L | 284.04 |
| D6 | 102.175 |
| D16 | 2.835 |
| D24 | 4.028 |
| D27 | 2.969 |

TABLE 24

ZOOM LENS GROUP DATA

| Lens Group | First Surface | Focal Length |
|---|---|---|
| 1 | 1 | 163.17 |
| 2 | 7 | −21.67 |
| 3a(3) | 17 | 37.41 |
| 3b(4) | 25 | −86.92 |
| 4(5) | 28 | 81.73 |

The numerical values of each condition for each embodiment are shown in Table 25.

TABLE 25

| | Embod. 1 | Embod. 2 | Embod. 3 |
|---|---|---|---|
| Condition (1) | 0.41 | 0.59 | 0.51 |
| Condition (2) | −0.05 | −0.05 | −0.14 |
| Condition (3) | 0.61 | 0.59 | 0.58 |
| Condition (4) | 4.44 | 3.62 | 3.09 |
| | Embod. 4 | Embod. 5 | Embod. 6 |
| Condition (1) | 0.31 | 0.51 | 0.57 |
| Condition (2) | 0.06 | −0.05 | −0.12 |
| Condition (3) | 0.61 | 0.51 | 0.57 |
| Condition (4) | 3.43 | 3.82 | 3.50 |

As can be understood from Table 25, the first through sixth embodiments satisfy conditions (1) through (4). Furthermore, as can be understood from the aberration diagrams, the various aberrations are suitably corrected.

According to the present invention, an optically superior high zoom-ratio zoom lens system is achieved, having a zoom ratio exceeding 13:1, having a focal length of 350 mm at the long focal length extremity, achieving an f-number of 5.6, and having a half angle-of-view of approximately 60° at the short focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a positive first lens group, a negative second lens group, a positive third lens group, and a positive fourth lens group, in this order from an object, the positive third lens group having positive power in an entire zooming range of zoom lens system,
   wherein upon zooming from the short focal length extremity to the long focal length extremity, a distance between said positive first lens group and said negative second lens group increases, and a distance between said negative second lens group and said positive third lens group decreases;
   wherein said positive third lens group comprises a positive first sub-lens group and a negative second sub-lens group, in this order from the object;
   wherein said positive first sub-lens group comprises a positive lens element provided at the most object-side thereof and a cemented lens provided at the most image-side thereof;
   wherein said cemented lens comprises a positive lens element and a negative lens element; and
   wherein said zoom lens system satisfies the following conditions:

$0.3 < f3a/f31 < 0.6$ $-0.15 < f3a/f3PN \leq 0.06$ wherein
   f3a designates a focal length of said positive first sub-lens group;
   f31 designates a focal length of said positive lens element provided at the most object-side of said positive first sub-lens group; and
   f3PN designates a focal length of said cemented lens provided at the most image-side of said positive first sub-lens group.

2. The zoom lens system according to claim 1, wherein said negative second lens group comprises a negative lens element, a negative lens element, a positive lens element, a negative lens element and a negative lens element, in this order from the object.

3. The zoom lens system according to claim 1, wherein said negative second lens group comprises a negative lens element, a negative lens element and a positive lens element, in this order from the image; and
   wherein each of said two negative lens elements has a concave surface facing toward the object.

4. The zoom lens system according to claim 2, wherein said negative second lens group comprises a negative meniscus lens element having a convex surface facing toward the object, a biconcave negative lens element, a cemented lens including a biconvex positive lens element and a negative lens element having a concave surface facing toward the object, and a negative lens element having a concave surface facing toward the object, in this order from the object.

5. The zoom lens system according to claim 1, further satisfying the following condition:

$$2.5 < f1/R2F < 5.0$$

wherein f1 designates a focal length of said positive first lens group; and

R2F designates a radius of curvature of the most object-side surface of said negative second lens group.

6. The zoom lens system according to claim 1, wherein a positive lens element is incorporated into said negative second lens group.

7. The zoom lens system according to claim 1, wherein said positive first sub-lens group and the negative second sub-lens group are arranged to maintain a fixed distance therebetween when zooming is performed.

8. The zoom lens system according to claim 1, wherein said positive first sub-lens group and said negative second sub-lens group are arranged to vary a distance therebetween when zooming is performed.

9. A zoom lens system comprises a positive first lens group, a negative second lens group, a positive third lens group, and a positive fourth lens group, in this order from an object, the positive third lens group having positive power in an entire zooming range of the zoom lens system, wherein upon zooming from the short focal length extremity to the long focal length extremity, a distance between said positive first lens group and said negative second lens group increases, and a distance between said negative second lens group and said positive third lens group decreases;

wherein said positive third lens group comprises a positive first sub-lens group and a negative second sub-lens group, in this order from the object;

wherein said positive first sub-lens group comprises a cemented lens provided at the most image-side thereof and at least two positive lens elements on the object side of said cemented lens;

wherein said cemented lens comprises a positive lens element and a negative lens element; and wherein said zoom lens system satisfies the following conditions:

$$0.3 < f3a/f3p < 0.7$$

$$-0.15 < f3a/f3PN \leq 0.06$$

wherein f3$a$ designates a focal length of said positive first sub-lens group;

f3$p$ designates a focal length of a positive lens element having the strongest refractive power among said at least two positive lens elements on the object side of said cemented lens; and f3PN designates a focal length of said cemented lens provided at the most image-side of said positive first sub-lens group.

10. The zoom lens system according to claim 9, wherein said negative second lens group comprises a negative lens element, a negative lens element, a positive lens element, a negative lens element and a negative lens element, in this order from the object.

11. The zoom lens system according to claim 9, wherein said negative second lens group comprises a negative lens element, a negative lens element and a positive lens element, in this order from the image; and wherein each of said two negative lens elements has a concave surface facing toward the object.

12. The zoom lens system according to claim 10, wherein said negative second lens group comprises a negative meniscus lens element having the convex surface facing toward the object, a biconcave negative lens element, a cemented lens including a biconvex positive lens element and a negative lens element having a concave surface facing toward the object, and a negative lens element having a concave surface facing toward the object, in this order from the object.

13. The zoom lens system according to claim 9, further satisfying the following condition:

$$2.5 < f1/R2F < 5.0$$

wherein f1 designates the focal length of said positive first lens group; and

R2F designates the radius of curvature of the most object-side surface of said negative second lens group.

14. The zoom lens system according to claim 9, wherein a positive lens element is incorporated into said negative second lens group.

15. The zoom lens system according to claim 9, wherein said positive first sub-lens group and the negative second sub-lens group are arranged to maintain a fixed distance therebetween when zooming is performed.

16. The zoom lens system according to claim 9, wherein said positive first sub-lens group and said negative second sub-lens group are arranged to vary the distance therebetween when zooming is performed.

17. The zoom lens system according to claim 3, wherein said negative second lens group comprises a negative meniscus lens element having a convex surface facing toward the object, a biconcave negative lens element, a cemented lens including a biconvex positive lens element and a negative meniscus lens element having the concave surface facing toward the object, and a negative lens element having a concave surface facing toward the object, in this order from the object.

18. The zoom lens system according to claim 11, wherein said negative second lens group comprises a negative meniscus lens element having a convex surface facing toward the object, a biconcave negative lens element, a cemented lens including a biconvex positive lens element and a negative meniscus lens element having the concave surface facing toward the object, and a negative lens element having a concave surface facing toward the object, in this order from the object.

* * * * *